(12) United States Patent
Gao et al.

(10) Patent No.: US 12,306,769 B2
(45) Date of Patent: May 20, 2025

(54) INTEGRATED CHIP AND DATA PROCESSING METHOD

(71) Applicant: HUAWEI TECHNOLOGIES CO., LTD., Guangdong (CN)

(72) Inventors: Changjian Gao, Shenzhen (CN); Yu Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 3 days.

(21) Appl. No.: 17/558,431

(22) Filed: Dec. 21, 2021

(65) Prior Publication Data
US 2022/0114111 A1 Apr. 14, 2022

Related U.S. Application Data

(63) Continuation of application No. PCT/CN2019/092414, filed on Jun. 21, 2019.

(51) Int. Cl.
*G06F 12/14* (2006.01)
*G06F 3/06* (2006.01)

(52) U.S. Cl.
CPC ........ *G06F 12/1458* (2013.01); *G06F 3/0622* (2013.01); *G06F 3/0659* (2013.01); *G06F 3/0673* (2013.01); *G06F 12/1441* (2013.01)

(58) Field of Classification Search
CPC .. G06F 12/1458; G06F 3/0622; G06F 3/0659; G06F 3/073; G06F 12/1441
See application file for complete search history.

(56) References Cited

U.S. PATENT DOCUMENTS

| | | | |
|---|---|---|---|
| 8,832,465 B2 | 9/2014 | Gulati et al. | |
| 9,547,778 B1* | 1/2017 | Paaske | H04L 9/30 |
| 10,102,391 B2 | 10/2018 | Sharp et al. | |
| 2009/0327548 A1 | 12/2009 | Hofmann et al. | |
| 2014/0089617 A1* | 3/2014 | Polzin | G06F 12/1441 |
| | | | 711/E12.091 |

(Continued)

FOREIGN PATENT DOCUMENTS

| CN | 103119602 A | 5/2013 |
|---|---|---|
| CN | 104981815 A | 10/2015 |

(Continued)

OTHER PUBLICATIONS

An article titled "Introduction to memory and memory units" downloaded from the web for geeks.org captured by web.archive.org on Jan. 2, 2020 that captures an article last updated Oct. 9, 2018, (Year: 2018).*

*Primary Examiner* — Michael Krofcheck
*Assistant Examiner* — Janice M. Girouard

(57) ABSTRACT

An integrated chip and a data processing method are provided, to improve system security and service processing efficiency of a system. The integrated chip includes: an application processor, configured to write first data into an off-chip memory in a normal secure mode by using a storage controller, where an address of the first data in the off-chip memory is a first address; a security processor, configured to send a first read instruction to the storage controller in an enhanced secure mode, where the first read instruction is used to request to read the first data at the first address; and the storage controller, configured to control the security processor to read the first data from the off-chip memory.

12 Claims, 11 Drawing Sheets

(56) References Cited

U.S. PATENT DOCUMENTS

2017/0124354 A1* 5/2017 Rohleder ................ G06F 21/70
2017/0164201 A1* 6/2017 Li ........................... G06F 21/57
2017/0185345 A1* 6/2017 Lim .................... G06F 12/1441
2017/0346628 A1* 11/2017 Lee ....................... H04L 9/0838

FOREIGN PATENT DOCUMENTS

| CN | 107103256 A | 8/2017 |
| CN | 107851138 A | 3/2018 |
| CN | 108563532 A | 9/2018 |
| CN | 109314705 A | 2/2019 |

* cited by examiner

INTEGRATED CHIP AND DATA PROCESSING METHOD

CROSS-REFERENCE TO RELATED APPLICATION

This application is a continuation of International Application No. PCT/CN2019/092414, filed on Jun. 21, 2019, the disclosure of which is hereby incorporated by reference in its entirety.

TECHNICAL FIELD

This application relates to the field of chip technologies, and in particular, to an integrated chip and a data processing method.

BACKGROUND

With development of an intelligent terminal and popularization of an Internet application, the intelligent terminal has more functions. In many application scenarios such as a mobile payment scenario and a mobile phone screen unlocking scenario, there are more security requirements on the intelligent terminal.

To improve system security, an existing system on chip (SoC) usually uses a TrustZone architecture. In the architecture, an application processor (AP) operates in a non-secure mode and a secure mode based on time. When operating in the non-secure mode, the AP processes a general application program, and when operating in the secure mode, the AP processes a program that needs to be securely processed. However, currently many attack models and instances enable the AP to switch from the non-secure mode to the secure mode, which is unauthorized. Therefore, security of the TrustZone architecture can hardly be ensured.

A processing manner of improving system security is to add an independent security processor based on the Trust-Zone architecture. In other words, the AP and an independent security processor are integrated into the SoC. The security processor may include a processor and another security component. The security processor is an independent security domain in the SoC. The security processor and the AP cannot directly access each other, but exchange information in an interrupt manner. As shown in FIG. 1, when transmitting data to the security processor, the AP first transmits the data to an inbox. When the inbox receives the data, the inbox triggers the security processor to be interrupted, and the security processor reads data from the inbox. When transmitting data to the AP, the security processor first transmits the data to an outbox. When receiving the data, the outbox sends an interrupt message to an interrupt controller. When the interrupt controller receives the interrupt message, the interrupt controller triggers the AP to be interrupted, and the AP reads the data from the outbox.

When the information exchange solution shown in FIG. 1 is used, an email box includes the inbox and the outbox. The inbox and the outbox are usually buffers in the chip of the SoC, and the buffer and the SoC are fabricated in a same die. Because storage space of the buffer is limited, efficiency of information exchange between the AP and the security processor is low. Especially, when a large data stream service is processed, using the foregoing solution greatly increases service processing time and affects service processing efficiency.

SUMMARY

Embodiments of this application provide an integrated chip and a data processing method, to improve system security and service processing efficiency of a system.

According to a first aspect, an embodiment of this application provides an integrated chip. The integrated chip includes: an application processor, configured to write first data into an off-chip memory in a normal secure mode by using a storage controller, where an address of the first data in the off-chip memory is a first address; a security processor, configured to send a first read instruction to the storage controller in an enhanced secure mode, where the first read instruction is used to request to read the first data at the first address; and the storage controller, configured to control the security processor to read the first data from the off-chip memory.

According to the integrated chip provided in the first aspect, after the application processor writes the first data into the off-chip memory in the normal secure mode by using the storage controller, the security processor may read the first data in the enhanced secure mode by using the storage controller. In the foregoing solution, the application processor can transmit the first data to the security processor. In the integrated chip provided in the first aspect, the application processor and the security processor may exchange data by using the off-chip memory under control of the storage controller. Compared with a solution in the conventional technology in which an application processor interacts with a security processor by using an email box (Inbox and Outbox), the interaction solution provided in the first aspect can improve information exchange efficiency because both storage space and transmission bandwidth of the off-chip memory are large. Especially, when a large data stream service is processed, using the off-chip memory to perform data exchange can greatly reduce service processing time, and service processing efficiency is improved.

In a possible design, the security processor is further configured to: process the read first data in the enhanced secure mode, and write processed data into the off-chip memory by using the storage controller; and the application processor is further configured to read the processed data from the off-chip memory in the normal secure mode by using the storage controller.

In the foregoing solution, after processing the first data, the security processor may also transmit the processed data to the application processor by using the off-chip memory.

Further, the application processor may read, in the following manner, the processed data from the off-chip memory by using the storage controller: The application processor sends a second read instruction to the storage controller in the normal secure mode. The second read instruction is used to request to read the processed data. The storage controller is further configured to control the application processor to read the processed data from the off-chip memory.

In other words, the application processor may read the processed data under control of the storage controller.

In addition, the security processor is further configured to: after writing the processed data into the off-chip memory by using the storage controller, notify, in an interrupt manner, the application processor to read the processed data.

In the foregoing solution, the security processor may notify, in the interrupt manner, the application processor to read the processed data.

In a possible design, the application processor is further configured to: after writing the first data into the off-chip memory by using the storage controller, notify, in the interrupt manner, the security processor to read the first data.

In a possible design, the storage controller may control, in the following manner, the security processor to read the first data from the off-chip memory: The storage controller determines that the first read instruction is authenticated. The storage controller reads the first data, and sends the first data to the security processor.

In the foregoing solution, the storage controller responds to the first read request only when the first read instruction is authenticated, so that security of the first data can be ensured.

Specifically, when determining that the first read instruction is authenticated, the storage controller is specifically configured to: determine, by the storage controller, that the first address belongs to a first storage area of the off-chip memory, where the first storage area is configured to allow a processor in the normal secure mode to perform a write/read operation and allow a processor in the enhanced secure mode to perform a read operation; and determine, by the storage controller, that the security processor is in the enhanced secure mode and the first read instruction is a read instruction.

In the foregoing solution, storage areas of different security attributes are configured in the off-chip memory, so that processors in different security modes exchange data with the off-chip memory. The first storage area may be considered as a storage area used for interaction between the application processor and the security processor. In the first storage area, the application processor in the normal secure mode can read data and write data, and the security processor in the enhanced secure mode can read data. Therefore, the application processor may transmit data to the security processor by using the first storage area.

In addition, the security processor is further configured to configure the first storage area as a storage area that allows the processor in the normal secure mode to perform a write/read operation and allows the processor in the enhanced secure mode to perform a read operation.

Specifically, the security processor may send first configuration information to the storage controller. The first configuration information is used to indicate that the first storage area allows the processor in the normal secure mode to perform a write/read operation and allows the processor in the enhanced secure mode to perform a read operation. Then the storage controller stores the first configuration information.

In the foregoing solution, only the security processor can configure a storage area related to operation permission of the processor in the enhanced secure mode, so that system security is improved.

In a possible design, when writing the processed data into the off-chip storage by using the storage controller, the security processor is specifically configured to send, by the security processor, a first write instruction to the storage controller in the enhanced secure mode. The first write instruction is used to request to write the processed data into a second address. The storage controller is further configured to: determine that the first write instruction is authenticated, and write the processed data into the second address.

In the foregoing solution, the storage controller responds to the first write instruction only when the first write instruction is authenticated, so that security of data at the second address can be ensured.

When determining that the first write instruction is authenticated, the storage controller is specifically configured to: determine, by the storage controller, that the second address belongs to a second storage area of the off-chip memory, where the second storage area is configured to allow the processor in the enhanced secure mode to perform a write/read operation and allow the processor in the normal secure mode to perform a read operation; and determine, by the storage controller, that the security processor is in the enhanced secure mode.

In the foregoing solution, storage areas of different security attributes are configured in the off-chip memory, so that processors in different security modes exchange data with the off-chip memory. The second storage area may be considered as a storage area used for interaction between the application processor and the security processor. In the second storage area, the security processor in the enhanced secure mode can read data and write data, and the application processor in the normal secure mode can read data. Therefore, the security processor may transmit data to the application processor by using the second storage area.

In a possible design, the security processor is further configured to configure the second storage area as a storage area that allows the processor in the enhanced secure mode to perform a write/read operation and allows the processor in the normal secure mode to perform a read operation.

Specifically, the security processor may send second configuration information to the storage controller. The second configuration information is used to indicate that the second storage area allows the processor in the enhanced secure mode to perform a write/read operation and allows the processor in the normal secure mode to perform a read operation. Then the storage controller stores the second configuration information.

In the foregoing solution, only the security processor can configure a storage area related to operation permission of the processor in the enhanced secure mode, so that system security is improved.

In a possible design, the security processor is further configured to: before processing the read first data, write second data into the off-chip memory in the enhanced secure mode by using the storage controller. An address of the second data in the off-chip memory is a third address. When processing the read first data in the enhanced secure mode, the security processor is specifically configured to: send a third read instruction to the storage controller in the enhanced secure mode, where the third read instruction is used to request to read the second data at the third address; read the second data from the off-chip memory by using the storage controller; and compare the first data with the second data, and use a comparison result as the processed data.

In the foregoing solution, when processing the first data, the security processor may compare the first data with the second data previously stored in the off-chip memory, and use the comparison result as the processed data. The second data may be stored in an enhanced secure write/read area in the off-chip memory, and data in the storage area can be accessed only by the processor in the enhanced secure mode, so that security of the second data can be ensured.

In a possible design, the storage controller is further configured to: when enhanced security indication information in the first read instruction is a first specified value, determine that the security processor is in the enhanced secure mode.

In the foregoing solution, only the security processor can set the enhanced security indication information to the first specified value. Therefore, when the enhanced security indication information in the first read instruction is the first specified value, the storage controller may determine that the processor sending the first read instruction is in the enhanced secure mode.

In addition, the enhanced security indication information is transmitted by using a signal cable in an internal interconnect bus of the integrated chip.

In other words, the enhanced security indication information may be transmitted by using an independent signal cable in the internal interconnect bus, and therefore enhanced secure data and normal secure data may be isolated from each other at a hardware level, so that system security is ensured.

In a possible design, the application processor is further configured to operate in a non-secure mode and the normal secure mode based on time.

In the foregoing solution, the processor in the integrated chip has three levels of security architectures, in other words, a security architecture (namely, an enhanced secure security architecture) with a higher security level is added on the basis of two levels of security architectures, namely, a non-secure security architecture and a secure security architecture, of an original integrated chip. The processor in the integrated chip may have three security attributes. A security level of an enhanced secure attribute is the highest, a security level of a normal secure attribute is the second, and a security level of a non-secure attribute is the lowest. The security processor with the enhanced secure attribute has an independent hardware architecture and a storage area (the enhanced secure write/read area) not shared with a processor with another security attribute. Therefore, secure space that can hardly be accessed by malicious code can be formed in the security processor, so that key data of a user is protected at a hardware level, and the key data of the user is stored in the enhanced secure write/read area, thereby ensuring security of the key data of the user.

According to a second aspect, an embodiment of this application provides an integrated chip. The integrated chip includes: an interconnect bus including a first signal cable and a second signal cable, where the first signal cable is configured to transmit enhanced security indication information, and the second signal cable is configured to transmit normal security indication information; a security processor, configured to send a first read instruction to a storage controller in an enhanced secure mode by using the interconnect bus, where enhanced security indication information included in the first read instruction is transmitted by using the first signal cable; and an application processor, configured to send a second read instruction to the storage controller in a normal secure mode by using the interconnect bus, where normal security indication information included in the second read instruction is transmitted by using the second signal cable.

In the foregoing solution, in the integrated chip, the security processor, the application processor, and the storage controller are connected by using the interconnect bus. Access instructions (including the first read instruction and the second read instruction) sent by the security processor and the application processor by using the interconnect bus include enhanced security indication information and normal security indication information. The enhanced security indication information is transmitted by using the first signal cable in the interconnect bus, and the normal security indication information is transmitted by using the second signal cable in the interconnect bus. The storage controller may determine, based on the received enhanced security indication information and normal security indication information, a security attribute of the processor sending the access instruction.

In a possible design, the integrated chip provided in the second aspect may further include the storage controller, configured to: when the enhanced security indication information included in the first read instruction is a first specified value, determine that the security processor is in the enhanced secure mode.

In the foregoing solution, a specific implementation of determining a security mode of a processor based on enhanced security indication information transmitted on the first signal cable.

In a possible design, the storage controller is further configured to: when the normal security indication information in the second read instruction is a second specified value, determine that the application processor is in the normal secure mode; or when the normal security indication information in the second read instruction is a third specified value, determine that the application processor is in a non-secure mode.

In the foregoing solution, a specific implementation of determining a processed security mode based on normal security indication information transmitted on the second signal cable.

According to a third aspect, an embodiment of this application provides a data processing method. The method includes the following steps: A storage controller receives a first read instruction sent by a security processor. The first read instruction is used to request to read first data at a first address in an off-chip memory. The storage controller determines that the first read instruction is authenticated. The storage controller reads the first data from the off-chip memory, and sends the first data to the security processor.

In a possible design, that the storage controller determines that the first read instruction is authenticated includes: The storage controller determines, by querying a local register, that the first address belongs to a first storage area of the off-chip memory. The first storage area is configured to allow a processor in the normal secure mode to perform a write/read operation and allow a processor in the enhanced secure mode to perform a read operation. The storage controller determines that the security processor is in the enhanced secure mode and the first read instruction is a read instruction.

In a possible design, that the storage controller determines that the security processor is in the enhanced secure mode includes: When enhanced security indication information in the first read instruction is a first specified value, the storage controller determines that the security processor is in the enhanced secure mode.

In a possible design, the method further includes: The storage controller receives first configuration information sent by the security processor. The first configuration information is used to indicate that the first storage area allows the processor in the normal secure mode to perform a write/read operation and allows the processor in the enhanced secure mode to perform a read operation. The storage controller stores the first configuration information in the local register.

In a possible design, the method further includes: After sending the first data to the security processor, the storage controller receives a first write instruction sent by the security processor. The first write instruction is used to request to write processed data into a second address, and the processed data is obtained after the security processor processes the first data. The storage controller determines that the first write instruction is authenticated. The storage controller writes the processed data into the second address.

In a possible design, that the storage controller determines that the first write instruction is authenticated includes: The storage controller determines, by querying the local register, that the second address belongs to a second storage area of the off-chip memory. The second storage area is configured to allow the processor in the enhanced secure mode to perform a write/read operation and allow the processor in the normal secure mode to perform a read operation. The storage controller determines that the security processor is in the enhanced secure mode.

In a possible design, the method further includes: The storage controller receives second configuration information sent by the security processor. The second configuration information is used to indicate that the second storage area allows the processor in the enhanced secure mode to perform a write/read operation and allows the processor in the normal secure mode to perform a read operation. The storage controller stores the second configuration information in the local register.

In a possible design, the method further includes: After writing the processed data into the second address, the storage controller receives a second read instruction sent by an application processor. The second read instruction is used to request to read the processed data. The storage controller determines that the second read instruction is authenticated. The storage controller reads the processed data, and sends the processed data to the application processor.

In a possible design, the storage controller may determine, in the following manner, that the second read instruction is authenticated: The storage controller determines that the second address belongs to the second storage area. The storage controller determines that the application processor is in the normal secure mode and the second read instruction is a read instruction.

The storage controller may determine, in the following manner, that the application processor is in the normal secure mode: When normal security indication information in the second read instruction is a second specified value, the storage controller determines that the application processor is in the normal secure mode.

In addition, for technical effects implemented in any possible design manner in the second aspect and the third aspect, refer to the technical effects implemented in different design manners in the first aspect. Details are not described herein again.

DESCRIPTION OF EMBODIMENTS

The embodiments of this application provide an integrated chip and a data processing method, to improve system security and service processing efficiency of a system.

The following first describes application scenarios of the embodiments of this application.

Figure 1:
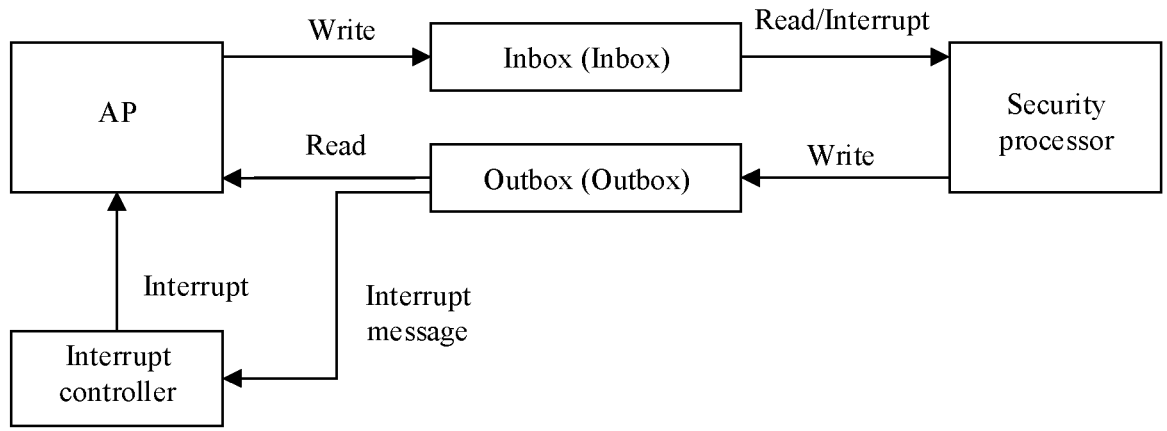
FIG. 1 is a schematic flowchart of interaction between an application processor and a security processor according to the conventional technology.
Figure 2:
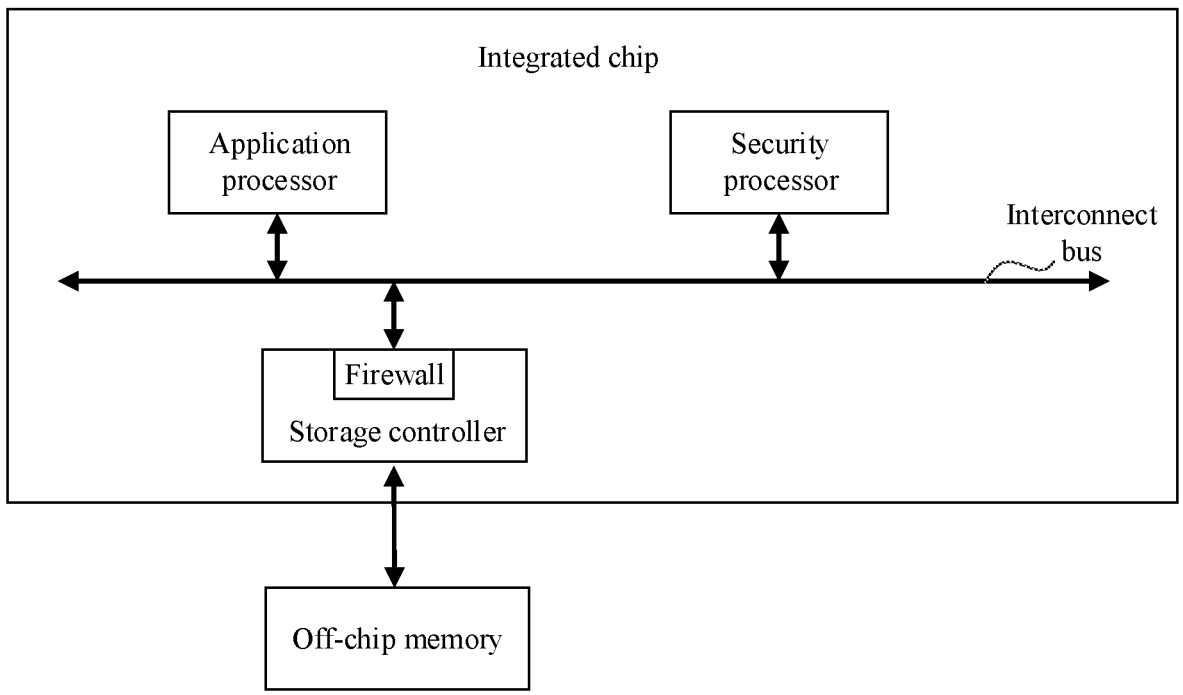
FIG. 2 is a schematic diagram of a structure of the first integrated chip according to an embodiment of this application.

The embodiments of this application may be applied to an integrated chip. Specifically, as shown in FIG. 2, the integrated chip includes an application processor, a security processor, and a storage controller that are connected by using an interconnect bus. The application processor is responsible for running an operating system and performing processing of a related application. The security processor is configured to process secure data in the integrated chip. The storage controller is connected to an off-chip memory, and is configured to control a processor (for example, the security processor or the application processor) in the integrated chip to exchange data with the off-chip memory. The storage controller controls the application processor to exchange data with the off-chip memory, and controls the security processor to exchange data with the off-chip memory, so that the application processor and the security processor in the integrated chip can exchange data with each other.

The off-chip memory may be understood as a memory located outside a die (die) in which the application processor and the security processor are located. In other words, the off-chip memory and the integrated chip shown in FIG. 2 belong to different dies. During chip packaging, a die in which the off-chip memory is located and a die in which the integrated chip is located may be packaged in different chips, or may be packaged in a same chip. FIG. 2 only illustrates an example in which the two are packaged in different chips. In the integrated chip shown in FIG. 2, the storage controller is responsible for data access and control of the off-chip memory. For example, if the off-chip memory is a dynamic random access memory (DRAM), the storage controller may be a dynamic random access memory controller (DRAM controller, DMC), and the DMC is responsible for data access and control of the DRAM; or if the off-chip memory is a flash memory (Flash), the storage controller may be a flash controller (FC), and the FC is responsible for data access and control of the flash memory.

The DRAM may be configured to store dynamic data during running of the integrated chip. Because the flash memory can store data after a system is powered off, the flash memory may be configured to store an image program and data that are expected to be further stored after a program is powered off. Certainly, the off-chip memory may be another memory, for example, may be a synchronous dynamic random access memory (SDRAM). This is not specifically limited in this embodiment of this application.

In addition, a quantity of storage controllers in the integrated chip and a quantity of off-chip memories connected to the integrated chip are not specifically limited in this embodiment of this application. For example, if the integrated chip includes the foregoing DMC and the FC, a structure of the integrated chip shown in FIG. 2 may be shown in FIG. 3. In the integrated chip shown in FIG. 3, the DMC is connected to the DRAM, the FC is connected to the flash memory, and the application processor and the security processor in the integrated chip may exchange data by using the DRAM under control of the DMC, or the application processor and the security processor in the integrated chip may exchange data by using the flash memory under control of the FC.

Similar to an application processor in a TrustZone architecture, the application processor in the embodiments of this application can operate in a non-secure mode and a secure mode based on time. In addition, a security processor is further disposed in the integrated chip provided in the embodiments of this application, and the security processor operates in a security mode with a higher security level. To distinguish between the two security modes, in the embodiments of this application, the security mode of the application processor is referred to as a "normal secure mode", and the security mode of the security processor is referred to as an "enhanced secure mode".

In descriptions of the embodiments of this application, the application processor being in the non-secure mode may also mean that the application processor has a non-secure attribute. In this case, the application processor may perform an operation of the non-secure attribute. The application processor being in the normal secure mode may also mean that the application processor has a normal secure attribute. In this case, the application processor may perform an operation of the normal secure attribute. The security processor being in the enhanced secure mode may also mean that the security processor has an enhanced secure attribute. In this case, the security processor may perform an operation of the enhanced secure attribute.

It can be learned that in the embodiments of this application, a processor has three levels of security architectures, in other words, the processor has three levels of security attributes: a non-secure attribute, a normal secure attribute, and an enhanced secure attribute. A security level of the enhanced secure attribute is higher than a security level of the normal secure attribute, so that isolated, closed, and secure space that can hardly be accessed by malicious code can be formed in the security processor with the enhanced secure attribute, thereby ensuring security of key data of a user in the space.

Correspondingly, in the embodiments of this application, storage areas of different security attributes may be configured in an off-chip memory based on different security levels, so that processors in different security modes exchange data with the off-chip memory. For example, a storage area of the enhanced secure attribute may be configured in the off-chip memory. Data stored in the storage area of the enhanced secure attribute can be accessed only by a processor in the enhanced secure mode, and another processor (for example, the application processor) in the integrated chip cannot access the storage area of the enhanced secure attribute. In the descriptions of the embodiments of this application, the storage area of the enhanced secure attribute may be referred to as an enhanced secure write/read area (enhanced_secure W/R area). For another example, a storage area of the normal secure attribute may be configured in the off-chip memory. Data stored in the storage area of the normal secure attribute can be accessed only by a processor in the normal secure mode, and another processor (for example, the security processor) in the integrated chip cannot access the storage area of the normal secure attribute. In the descriptions of the embodiments of this application, the storage area of the normal secure attribute may be referred to as a normal secure write/read area (secure W/R area).

Storage areas of different security attributes are configured in the off-chip memory, to physically isolate non-secure data, secure data, and enhanced secure data in the integrated chip, so that isolated, closed, and secure space that can hardly be accessed by malicious code that may be carried in a third-party application program and an operating system that run on the application processor is formed in the security processor. Code executed and data stored in such space have a higher security level, and can hardly be attacked by an attacker. Therefore, security of key data of the user can be ensured.

In addition, to implement data exchange between the security processor and the application processor, in the off-chip memory, a storage area that may be used for a processor in the normal secure mode to write/read data and a processor in the enhanced secure mode to read data may be further configured, and a storage area that may be used for the processor in the normal secure mode to read data and the processor in the enhanced secure mode to write/read data. In the descriptions of the embodiments of this application, the storage area used for the processor in the normal secure mode to write/read data and the processor in the enhanced secure mode to read data may be referred to as a normal secure write/read/enhanced secure read area (secure W/R enhanced_secure R area), and the storage area used for the processor in the normal secure mode to read data and the processor in the enhanced secure mode to write/read data may be referred to as an enhanced secure write/read/normal secure read area (enhanced_secure W/R secure R area).

In a specific example, the normal secure write/read/enhanced secure read area is referred to as a storage area A, and the enhanced secure write/read/normal secure read area is referred to as a storage area B. When transmitting data to the security processor, the application processor may write the data into the storage area A, and then notify the security processor to read the data from the storage area A. When transmitting data to the application processor, the security processor may write the data into the storage area B, and then notify the application processor to read the data from the storage area B. Therefore, using the storage area A and the storage area B can implement data exchange between the security processor and the application processor.

Figure 4:
FIG. 4 is a schematic diagram of storage area division in an off-chip memory according to an embodiment of this application.

For example, storage area division in the off-chip memory may be shown in FIG. 4. In the example of FIG. 4, the off-chip memory may be divided into five storage areas, 0x0000 to 0x3FFF is write/read space for the non-secure attribute, a processor with the normal secure mode can read data from the storage area, and the storage area may be referred to as a non-secure write/read/normal secure read area. 0x4000 to 0x5FFF is write/read space for the normal secure attribute, and only a processor with the normal secure attribute can write/read data into/from the area. 0x6000 to 0x7FFF is a storage area for data exchange between a processor with the enhanced secure attribute and the processor with the normal secure attribute, and 0x6000 to 0x6FFF is a normal secure write/read/enhanced secure read area. 0x7000 to 0x7FFF is an enhanced secure write/read/ normal secure read area. Finally, 0x8000 to 0xBFFF is write/read space for the enhanced secure attribute, and only the processor with the enhanced secure attribute can write/read data into/from the storage area.

It should be noted that the foregoing storage area division in the off-chip memory is only a specific example. In an actual application, a space size, write/read permission, and the like of the storage area may be flexibly configured based on a requirement. This is not specifically limited in the embodiments of this application.

In the integrated chip shown in FIG. 2, the interconnect bus (Interconnect) is responsible for connecting all subsystems (for example, the security processor, the application processor, and the storage controller) to ensure normal execution of an interconnect bus protocol. The interconnect bus may be a daisy chain interconnect bus, a ring interconnect bus, a crossbar interconnect bus, or any other type of interconnect bus. In addition, the interconnect bus may also be classified into a configuration interconnect bus and a data interconnect bus.

In the conventional technology, because the application processor can operate in the non-secure mode and the normal secure mode based on time, in the configuration interconnect bus, 1-bit data transmitted on a user-defined signal cable may be used to indicate a security mode of the application processor. In this application, the 1-bit data is referred to as normal security indication information. For example, when the normal security indication information is "1", it indicates that the application processor is in the normal secure mode; or when the normal security indication information is "0", it indicates that the application processor is in the non-secure mode.

In addition, because the integrated chip provided in the embodiments of this application further includes the security processor in the enhanced secure mode, 1-bit data transmitted on another user-defined signal cable may be further used to indicate whether a processor operates in the enhanced secure mode. In this application, the 1-bit data is referred to as enhanced security indication information. For example, when the enhanced security indication information is "1", it indicates that the processor is in the enhanced secure mode; or when the enhanced security indication information is "0", it indicates that the processor is not in the enhanced secure mode. In the integrated chip provided in the embodiments of this application, only the security processor can set the enhanced security indication information to "1", in other words, only the security processor can perform an operation of the enhanced secure attribute on the configuration interconnect bus, and another processor cannot perform an operation of the enhanced secure attribute on the configuration interconnect bus.

Figure 5:
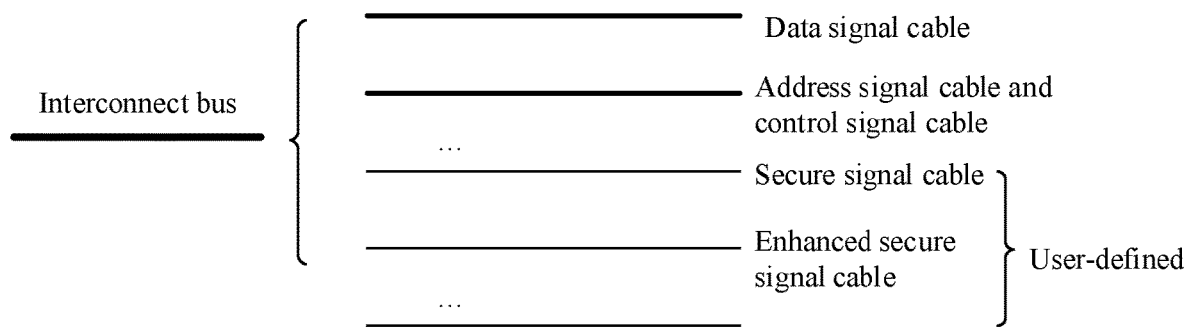
FIG. 5 is a schematic diagram of signal cable configuration of an interconnect bus according to an embodiment of this application.

For example, in the embodiments of this application, signal cable configuration of the interconnect bus (Interconnect) may be shown in FIG. 5. It can be learned from FIG. 5 that in addition to a data signal, an address signal, and a control signal that are required by an interconnect bus standard, a user-defined (reserved) signal exists to transmit a user-defined signal. In the embodiments of this application, normal security indication information may be transmitted by using a secure signal in a user-defined signal cable, and enhanced security indication information may be transmitted by using an enhanced secure signal cable.

By using the foregoing hardware connection manner of the interconnect bus, the non-secure attribute, the secure attribute, and the enhanced secure attribute of the processor are transmitted on the interconnect bus, and the storage controller may perform authentication on data access of the processor based on these attributes, to protect secure data and enhanced secure data at a hardware level.

For example, an access instruction (for example, a read instruction or a write instruction) sent by the application processor is transmitted by using the interconnect bus, and normal security indication information in the access instruction is transmitted by using the secure signal cable in FIG. 5. After receiving the access instruction, the storage controller determines that the normal security indication information transmitted on the secure signal cable is "1", and further determines that the processor sending the access instruction is in the normal secure mode; or after receiving the access instruction, the storage controller determines that the normal security indication information is "0", and further determines that the processor sending the access instruction is in the non-secure mode.

For example, an access instruction sent by the security processor is transmitted by using the interconnect bus, and enhanced security indication information in the access instruction is transmitted by using the enhanced secure signal cable in FIG. 5. After receiving the access instruction, the storage controller determines that the enhanced security indication information transmitted on the enhanced secure signal cable is "1", and further determines that the processor sending the access instruction is in the enhanced secure mode.

In an actual application, the foregoing authentication operation may be performed by a firewall of the storage controller. Specifically, the firewall in the storage controller has two functions: 1. storing storage area configuration information of the off-chip memory in a local register of the storage controller; 2. when a processor (for example, the security processor or the application processor) accesses the off-chip memory by using the storage controller, performing authentication on an access instruction sent by the processor.

For example, the application processor sends a data write instruction to the storage controller to request to write data into a storage area of the enhanced secure attribute. After receiving the data write instruction, the firewall in the storage controller determines that the normal security indication information transmitted on the secure signal cable is "1", and further determines that the processor sending the data write instruction is in the normal secure mode. In addition, after receiving the data write instruction, the firewall in the storage controller determines, by querying the storage area configuration information stored in the local register, that an address requested by the data write instruction belongs to the enhanced secure write/read area. Because the processor sending the data write instruction does not have the enhanced secure attribute, the data write instruction fails to be authenticated by the firewall, and the firewall returns an instruction error indication to the application processor.

For example, the security processor sends a data read instruction to the storage controller to request to read data in the normal secure write/read/enhanced secure read area. After receiving the data read instruction, the firewall in the storage controller determines that the enhanced security indication information transmitted on the enhanced secure signal cable is "1", and further determines that the processor sending the data read instruction is in the enhanced secure mode. In addition, after receiving the data read instruction, the firewall in the storage controller determines, by querying the storage area configuration information stored in the local register, that an address requested by the data read instruction belongs to the normal secure write/read/enhanced secure read area. Because the processor sending the data read instruction has the enhanced secure attribute and the instruction is a read instruction, the data read instruction is authenticated by the firewall, and the storage controller sends the data read instruction to the off-chip memory to complete data reading.

Figure 6:
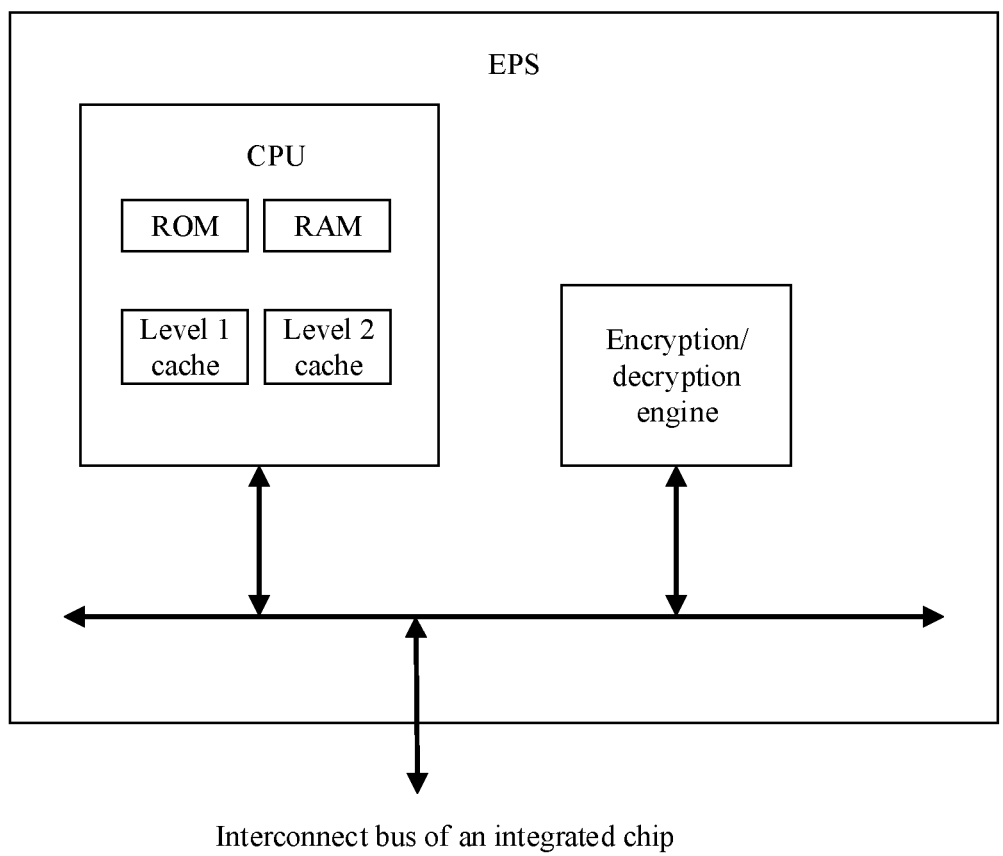
FIG. 6 is a schematic diagram of a structure of a security processor according to an embodiment of this application.

In the embodiments of this application, the security processor may also be referred to as an enhanced processor for security (EPS). The EPS may be considered as a secure subsystem in the integrated chip, and is an independent processor other than the application processor. As shown in FIG. 6, the EPS may include an independent central processing unit (CPU) and an encryption/decryption engine (Crypto) module that defends against a physical attack. Both the CPU and the encryption/decryption engine module in the EPS have the enhanced secure attribute. In addition, in the embodiments of this application, the CPU in the EPS may further configure the encryption/decryption engine module in the normal secure mode, so that a processor (for example, the application processor) outside the EPS can also use the encryption/decryption engine module to perform a related cryptography operation.

In the EPS shown in FIG. 6, the CPU may also be referred to as a secure core or a secure CPU (secure CPU). Specifically, the security core may further include a read only memory (read only memory, ROM), a random access memory (RAM), a level 1 cache (L1 cache), a level 2 cache (L2 cache), and the like that can be accessed only by a processor with the enhanced secure attribute.

In the EPS shown in FIG. 6, the encryption/decryption engine module may include various encryption/decryption engines. Encryption/decryption algorithms used by these encryption/decryption engines include but are not limited to a Rivest Shamir Adleman (RSA) encryption algorithm, an elliptic curve cryptography (ECC) algorithm, an advanced encryption standard (AES) algorithm, a data encryption standard (DES) algorithm, and a secure hash algorithm (SHA).

In the EPS, the CPU, the encryption/decryption engine module, and the like are connected by using an internal interconnect bus of the EPS. The internal interconnect bus of the EPS may use same signal cable configuration as the interconnect bus of the integrated chip. In other words, the internal interconnect bus of the EPS also includes an enhanced secure signal cable used to transmit enhanced security indication information and a secure signal cable used to transmit normal security indication information. The internal interconnect bus of the EPS is connected to the chip of the integrated chip to transmit data and a configuration parameter.

In the embodiments of this application, the EPS may be configured to implement an operation that requires a high security level in the integrated chip, for example, implement storage of a root key, key derivation, accelerated running of an encryption/decryption algorithm, and implement support in application scenarios such as a physical attack defense capability, a side channel attack defense capability, underlying driver software, a security operating system (OS), a security application, and a security protocol. The security application includes but is not limited to fingerprint recognition, facial recognition, and the like.

It should be noted that a type of the integrated chip is not specifically limited in the embodiments of this application. The integrated chip may be a chip such as an SoC, an electronic control unit (ECU), or an internet of things (IoT) chip, or may be another chip in a terminal.

The following further describes in detail the embodiments of this application with reference to accompanying drawings.

It should be noted that "a plurality of" in the embodiments of this application means two or more than two. In addition, it should be understood that, in the descriptions of this application, terms such as "first" and "second" are merely used for distinguishing and description, but cannot be understood as indicating or implying relative importance, or indicating or implying an order.

Figure 7:
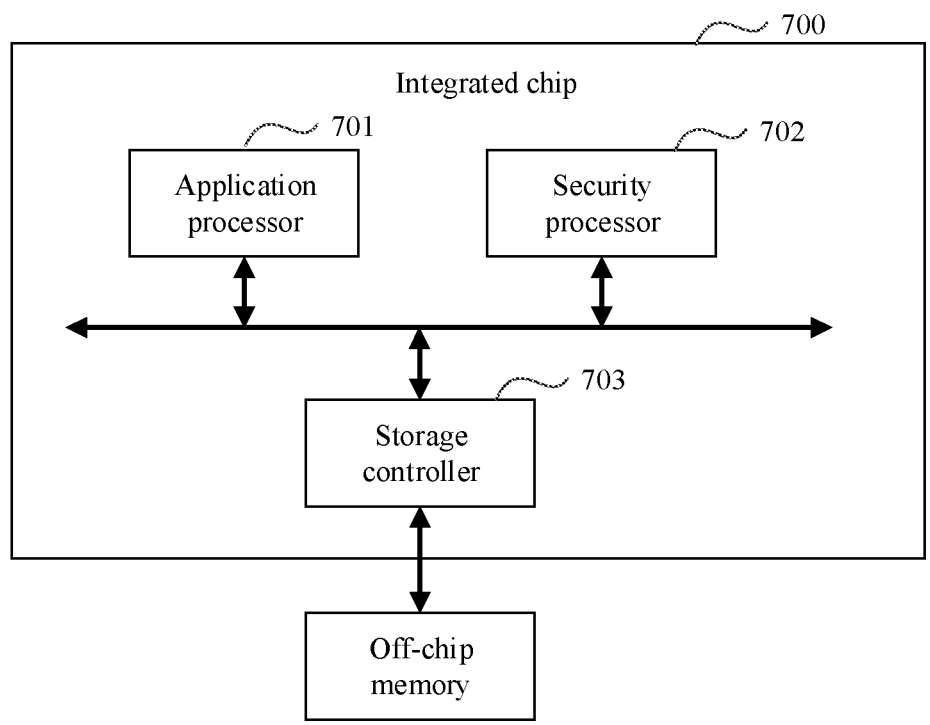
FIG. 7 is a schematic diagram of a structure of the third integrated chip according to an embodiment of this application.

FIG. 7 is a schematic diagram of a structure of an integrated chip according to an embodiment of this application. An integrated chip 700 shown in FIG. 7 includes an application processor 701, a security processor 702, and a storage controller 703.

The application processor 701 is configured to write first data into an off-chip memory in a normal secure mode by using the storage controller 703. An address of the first data in the off-chip memory is a first address. The security processor 702 is configured to send a first read instruction to the storage controller 703 in an enhanced secure mode. The first read instruction is used to request to read the first data at the first address. The storage controller 703 is configured to control the security processor 702 to read the first data from the off-chip memory.

The application processor 701 interacts with the security processor 702 in the foregoing manner, so that the application processor 701 can transmit the first data to the security processor 702. Specifically, when the application processor 701 transmits the first data to the security processor 702, instead of performing data transmission by using an email box (Inbox and Outbox) in the conventional technology, the application processor 701 writes, into the off-chip memory, the first data that needs to be transmitted, and then the security processor 702 reads the first data from the off-chip memory. Compared with the email box manner, this data transmission manner can improve efficiency of information exchange between the application processor 701 and the security processor 702 because both storage space and transmission bandwidth of the off-chip memory are large. Especially, when a large data stream service is processed, using the off-chip memory to perform data exchange can greatly reduce service processing time, and service processing efficiency is improved.

It should be noted that a processor in this embodiment of this application has three levels of security architectures, and a security level of an enhanced secure attribute is the highest. To enable secure space that can hardly be accessed by malicious code to be formed in the security processor with the enhanced secure attribute, in this embodiment of this application, the application processor in the normal secure mode usually exchanges data with the security processor, and when the application processor is in a non-secure mode, the application processor usually does not exchange data with the security processor, so that key data of a user can be prevented from being stolen in the non-secure mode. Certainly, in this embodiment of this application, a security mode of the application processor 701 is not limited, in other words, the application processor 701 may operate in the non-secure mode and the normal secure mode based on time when performing another operation, provided that the application processor 701 is in the normal secure mode when exchanging data with the security processor 702.

After the application processor 701 writes the first data by using the storage controller 703, the application processor 701 may further notify, in an interrupt manner, the security processor 702 to read the first data. The security processor 702 may send the first read instruction after being notified by the application processor 701.

In other words, in this embodiment of this application, when sending the first data to the security processor 702, the application processor 701 may first store the first data in the off-chip memory, and then notify, in the interrupt manner, the security processor 702 to read the first data, to trigger the security processor 702 to send the first read instruction. After receiving the first read instruction, the storage controller 703 controls the security processor 702 to read the first data from the off-chip memory. In this solution, although the application processor 701 and the security processor 702 also need to interact in the interrupt manner, data transmitted in the interrupt manner is only used to notify the security processor 702 to read the first data, and an amount of data transmitted in the interrupt manner is small, and therefore service processing efficiency is not greatly affected.

In addition, after reading the first data, the security processor 702 may process the read first data, and write processed data into the off-chip memory by using the storage controller 703. Then the application processor 701 may read the processed data from the off-chip memory in the normal secure mode by using the storage controller 703.

Similarly, after writing the processed data into the off-chip memory by using the storage controller 703, the security processor 702 may also notify, in the interrupt manner, the application processor 701 to read the processed data.

In other words, after processing the first data, the security processor 702 may also write the processed data into the off-chip memory in a manner similar to a manner in which the application processor 701 transmits the first data, and then notify the application processor 701 in the interrupt manner to trigger the application processor 701 to read the processed data.

Specifically, the application processor 701 may send a second read instruction to the storage controller 703 in the normal secure mode, to request to read the processed data. Then the storage controller 703 may control the application processor 701 to read the processed data from the off-chip memory.

Further, before processing the read first data, the security processor 702 may further write second data into the off-chip memory in the enhanced secure mode by using the storage controller 703. An address of the second data in the off-chip memory is a third address. In this case, the security processor 702 may specifically process the read first data in the enhanced secure mode in the following manner: The security processor 702 sends a third read instruction to the storage controller 703 in the enhanced secure mode. The third read instruction is used to request to read the second data at the third address. Then the security processor 702 reads the second data from the off-chip memory by using the storage controller 703. Finally, the security processor 702 compares the first data with the second data, and uses a comparison result as the processed data.

In other words, when processing the first data, the security processor 702 may compare the first data with the second data previously stored in the off-chip memory, and use the comparison result as the processed data. The second data may be stored in an enhanced secure write/read area in the off-chip memory, and data in the storage area can be accessed only by a processor in the enhanced secure mode, so that security of the second data can be ensured. For example, the second data may be data whose security requirement is high, for example, a fingerprint template, a facial recognition template, and a payment password of the user.

Certainly, the foregoing processing process of the security processor 702 is only an example, and the security processor 702 may process the first data in a plurality of manners in an actual application.

Figure 8:
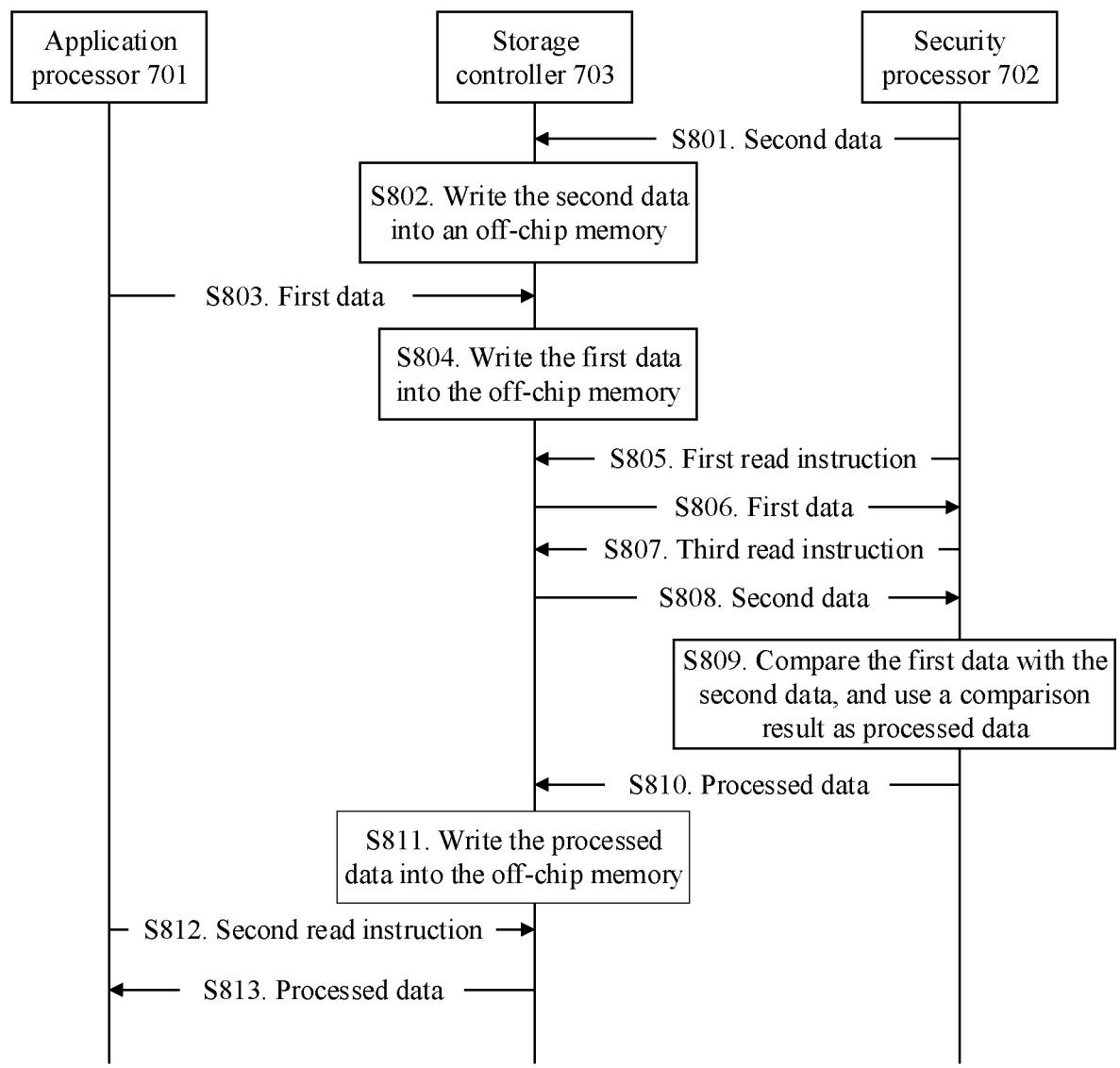
FIG. 8 is a schematic flowchart of interaction between components in an integrated chip according to an embodiment of this application.

With reference to the foregoing descriptions, a possible interaction manner between the application processor 701, the security processor 702, and the storage controller 703 may be shown in FIG. 8.

S801. The security processor 702 sends second data to the storage controller 703 in an enhanced secure mode, to request to write the second data into an off-chip memory.

An address of the second data in the off-chip memory is a third address.

S802. The storage controller 703 controls the security processor 702 to write the second data into the off-chip memory.

Specifically, the security processor 702 may write the second data into an enhanced secure write/read area in the off-chip memory. Only a processor in the enhanced secure mode can write/read data in the storage area, and a processor that does not have an enhanced secure attribute has no permission to access the data in the storage area, so that security of the data in the storage area is ensured.

S803. The application processor 701 sends first data to the storage controller 703 in a normal secure mode, to request to write the first data into the off-chip memory.

An address of the first data in the off-chip memory is a first address.

S804. The storage controller 703 controls the application processor 701 to write the first data into the off-chip memory.

Specifically, the application processor 701 may write the first data into a normal secure write/read/enhanced secure read area in the off-chip memory.

S805. After receiving an interrupt message sent by the application processor 701, the security processor 702 sends a first read instruction to the storage controller 703 in the enhanced secure mode.

The first read instruction is used to request to read the first data at the first address.

S806. The storage controller 703 controls the security processor 702 to read the first data from the off-chip memory.

S807. The security processor 702 sends a third read instruction to the storage controller 703 in the enhanced secure mode.

The third read instruction is used to request to read the second data at the third address.

S808. The storage controller 703 controls the security processor 702 to read the second data from the off-chip memory.

S809. The security processor 702 compares the first data with the second data in the enhanced secure mode, and uses a comparison result as processed data.

S810. The security processor 702 sends the processed data to the storage controller 703 in the enhanced secure mode, to request to write the processed data into the off-chip memory.

S811. The storage controller 703 controls the security processor 702 to write the processed data into the off-chip memory.

Specifically, the security processor 702 may write the first data into an enhanced secure write/read/normal secure read area in the off-chip memory.

S812. After receiving an interrupt message sent by the security processor 702, the application processor 701 sends a second read instruction to the storage controller 703 in the normal secure mode.

The second read instruction is used to request to read the processed data.

S813. The storage controller 703 controls the application processor 701 to read the processed data from the off-chip memory.

In a specific example, the first data may be fingerprint data collected by a terminal device in which the integrated chip 700 is located, and the second data may be a fingerprint template prestored by the security processor 702 in the enhanced secure write/read area. Through S801 and S802, the security processor 702 stores the fingerprint template in the off-chip memory by using the storage controller 703. Through S803 and S804, the application processor 701 stores the collected fingerprint data in the off-chip memory by using the storage controller 703. Through S805 to S808, the security processor 702 separately reads the fingerprint template and the collected fingerprint data from different storage areas of the off-chip memory. Through S809, the security processor 702 compares the fingerprint template with the collected fingerprint data, and uses a comparison result as processed data. Through S810 and S811, the security processor 702 writes the processed data into the off-chip memory. Through S812 and S813, the application processor 701 may read the processed data. If the comparison result indicates that the fingerprint data currently collected by the terminal device matches the fingerprint template, after receiving the processed data, the application processor 701 may perform processing such as fingerprint unlocking processing or payment processing. If the comparison result indicates that the fingerprint data currently collected by the terminal device does not match the fingerprint template, the application processor 701 may perform processing such as fingerprint unlocking rejection or payment rejection.

It can be learned from the foregoing descriptions that, in this embodiment of this application, when requesting to access the off-chip memory, a processor (for example, the application processor 701 or the security processor 702) needs to access the off-chip memory under control of the storage controller 703. Specifically, the storage controller 703 may perform authentication on a read instruction or a write instruction sent by the processor. When the instruction is authenticated, the storage controller 703 responds to the instruction; or when the instruction fails to be authenticated, the storage controller 703 rejects an access request of the processor.

The following separately describes authentication processes of the storage controller 703 for the read instruction and the write instruction.

1. Authentication of the Read Instruction

Specifically, the storage controller 703 may control, in the following manner, the security processor 702 to read the first data from the off-chip memory: The storage controller 703 determines that the first read instruction is authenticated. The storage controller 703 reads the first data, and sends the first data to the security processor 702.

It can be learned that the storage controller 703 responds to a request of the first read instruction only when the first read instruction is authenticated. If the first read instruction fails to be authenticated, the storage controller 703 rejects a request of the first read instruction, and returns an interconnect bus error indication to the security processor 702.

During specific implementation, the storage controller 703 may determine, in the following manner, that the first read instruction is authenticated: The storage controller 703 determines that the first address belongs to a first storage area of the off-chip memory. The first storage area is configured to allow a processor in the normal secure mode to perform a write/read operation and allow a processor in the enhanced secure mode to perform a read operation. The storage controller 703 determines that the security processor 702 is in the enhanced secure mode and the first read instruction is a read instruction.

As described above, storage areas of different security attributes are configured in the off-chip memory, so that processors in different security modes exchange data with the off-chip memory. Herein, the first storage area may be considered as a storage area used for interaction between the application processor 701 and the security processor 702. In the first storage area, the application processor 701 in the normal secure mode can read data and write data, and the security processor 702 in the enhanced secure mode can read data. Therefore, the application processor 701 may transmit data to the security processor 702 by using the first storage area. The first storage area may be considered as the foregoing normal secure write/read/enhanced secure read area.

Generally, when performing authentication on a read instruction sent by a processor, the storage controller 703 first determines, by querying a local register, a storage area to which an address requested by the read instruction belongs in the off-chip memory. Then the storage controller 703 first determines a security attribute of the processor sending the read instruction, and then determines whether a processor with the security attribute has permission to perform a read operation on the storage area. In the foregoing example, the storage controller 703 determines, by querying the local register, that the first address requested by the first read instruction belongs to the first storage area that allows the processor in the normal secure mode to perform a write/read operation and allows the processor in the enhanced secure mode to perform a read operation. Then the storage controller 703 determines that the security processor 702 sending the first read instruction is in the enhanced secure mode. The first storage area allows the processor in the enhanced secure mode to perform a read operation, and the first read instruction is exactly a read instruction. Therefore, the first read instruction can be authenticated by the storage controller 703.

The foregoing manner in which the storage controller 703 performs authentication on the first read instruction is only a specific example. In an actual application, when receiving any read instruction for reading data in the off-chip memory, the storage controller 703 needs to perform authentication on the read instruction. For example, in the interaction procedure shown in FIG. 8, when performing S808 to control the security processor 702 to read the second data from the off-chip memory, the storage controller 703 also needs to perform authentication on the third read instruction sent by the security processor 702. When performing S813 to control the application processor 701 to read the processed data from the off-chip memory, the storage controller 703 also needs to perform authentication on the second read instruction sent by the application processor 701. Manners of performing authentication on the third read instruction and the second read instruction are similar to the manner of performing authentication on the first read instruction, and details are not described herein again.

Certainly, the foregoing uses an example in which the read instruction is authenticated. In an actual application, a read instruction may fail to be authenticated by the storage controller 703. For example, the storage controller 703 receives a read instruction that is sent by the application processor 701 and that is used to request to read data stored in the enhanced secure write/read area. The storage controller 703 determines, by querying the local register, that an address requested by the read instruction belongs to the enhanced secure write/read area. In addition, the storage controller 703 determines that the application processor 701 sending the read instruction is in the normal secure mode, and the processor in the normal secure mode is not allowed to read the data stored in the enhanced secure write/read area. Therefore, the storage controller 703 determines that the read instruction fails to be authenticated.

2. Authentication of the Write Instruction

Specifically, the security processor 702 may write, in the following manner, the processed data into the off-chip memory by using the storage controller 703: The security processor 702 sends a first write instruction to the storage controller 703 in the enhanced secure mode. The first write instruction is used to request to write the processed data into a second address. The storage controller 703 is further configured to: determine that the first write instruction is authenticated, and write the processed data into the second address.

It can be learned that the storage controller 703 responds to a request of the first write instruction only when the first write instruction is authenticated. If the first write instruction fails to be authenticated, the storage controller 703 rejects a request of the first write instruction, and returns an interconnect bus error indication to the security processor 702.

During specific implementation, the storage controller 703 may specifically determine, in the following manner, that the first write instruction is authenticated: The storage controller 703 determines that the second address belongs to a second storage area of the off-chip memory. The second storage area is configured to allow a processor in the enhanced secure mode to perform a write/read operation and allow a processor in the normal secure mode to perform a read operation. The storage controller 703 determines that the security processor 702 is in the enhanced secure mode.

As described above, storage areas of different security attributes are configured in the off-chip memory, so that processors in different security modes exchange data with the off-chip memory. Herein, the second storage area may be considered as a storage area used for interaction between the application processor 701 and the security processor 702. In the second storage area, the security processor 702 in the enhanced secure mode can read data and write data, and the application processor 701 in the normal secure mode can read data. Therefore, the security processor 702 may transmit data to the application processor 701 by using the second storage area. The second storage area may be considered as the foregoing enhanced secure write/read/normal secure read area.

Generally, when performing authentication on a write instruction sent by a processor, the storage controller 703 first determines, by querying a local register, a storage area to which an address requested by the write instruction belongs in the off-chip memory. Then the storage controller 703 first determines a security attribute of the processor sending the write instruction, and then determines whether a processor with the security attribute has permission to perform a write operation on the storage area. In the foregoing example, the storage controller 703 determines, by querying the local register, that the second address requested by the first write instruction belongs to the second storage area that allows the processor in the enhanced secure mode to perform a write/read operation and allows the processor in the normal secure mode to perform a read operation. Then, the storage controller 703 determines that the security processor 702 sending the first write instruction is in the enhanced secure mode. The second storage area allows the processor in the enhanced secure mode to perform a write operation and a read operation. Therefore, the first write instruction can be authenticated by the storage controller 703.

The foregoing manner in which the storage controller 703 performs authentication on the first write instruction is only a specific example. In an actual application, when receiving any write instruction for writing data into the off-chip memory, the storage controller 703 needs to perform authentication on the write instruction. For example, in the interaction procedure shown in FIG. 8, when performing S802 to control the security processor 702 to write the second data into the off-chip memory, the storage controller 703 also needs to perform authentication on a write instruction that is sent by the security processor 702 and that is used to write the second data. When performing S804 to control the application processor 701 to write the first data into the off-chip memory, the storage controller 703 also needs to perform authentication on a write instruction that is sent by the application processor 701 and that is used to write the first data. When performing S811 to control the security processor 702 to write the processed data into the off-chip memory, the storage controller 703 also needs to perform authentication on a write instruction that is sent by the security processor 702 and that is used to write the processed data. Manners of performing authentication on the write instructions are similar to the manner of performing authentication on the first write instruction, and details are not described herein again.

Certainly, the foregoing uses an example in which the write instruction is authenticated. In an actual application, a write instruction may fail to be authenticated by the storage controller 703. For example, the storage controller 703 receives a write instruction that is sent by the application processor 701 and that is used to request to write data into the second storage area. The storage controller 703 determines, by querying the local register, that an address requested by the write instruction belongs to the second storage area. The storage area allows the processor in the enhanced secure mode to perform a write/read operation and the processor in the normal secure mode to perform a read operation. In addition, the storage controller 703 determines that the application processor 701 sending the write instruction is in the normal secure mode, and the processor in the normal secure mode is not allowed to write data into the second storage area. Therefore, the storage controller 703 determines that the write instruction fails to be authenticated.

Figure 9A:
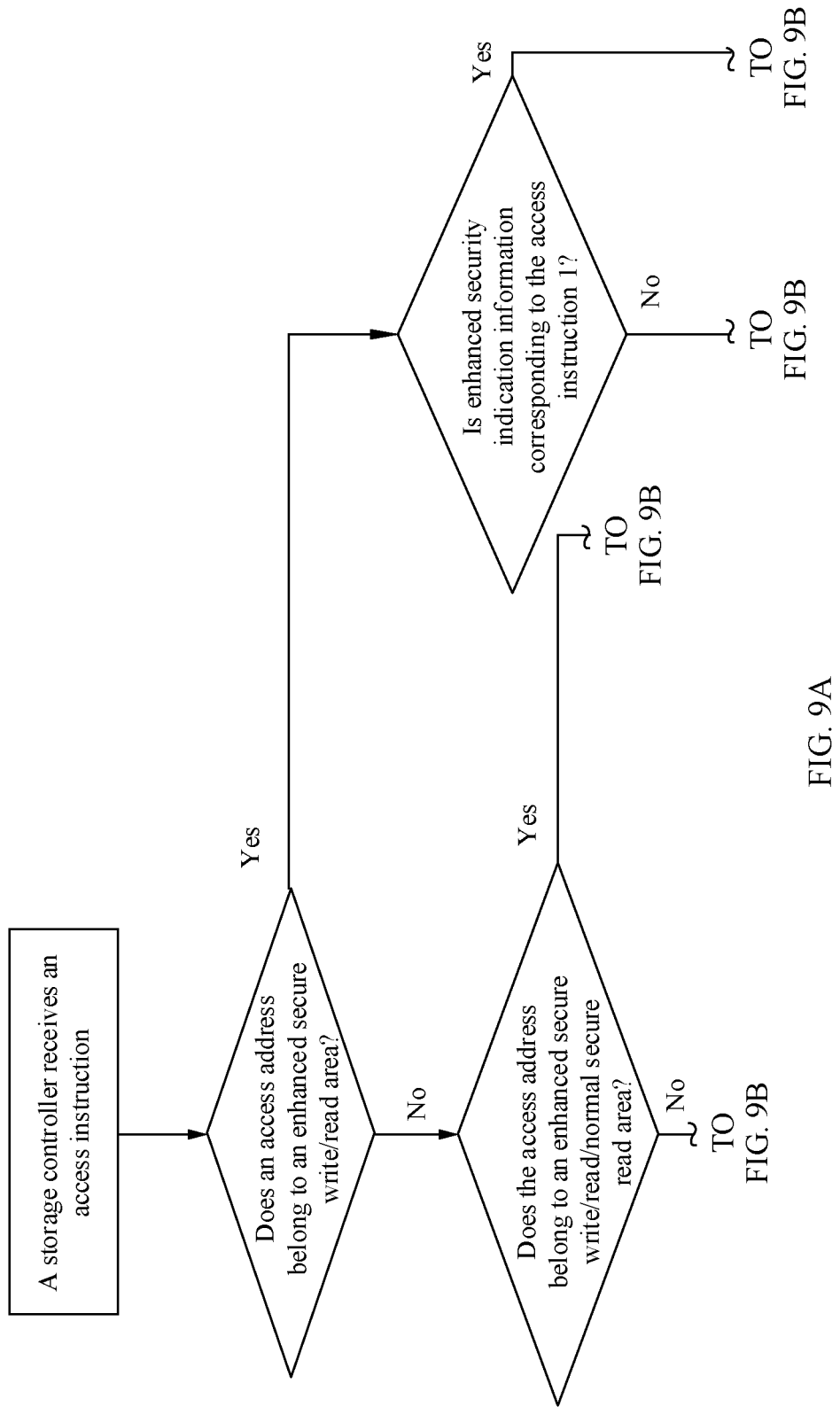
FIG. 9A, FIG. 9B, and FIG. 9C are a schematic diagram of an authentication procedure of a storage controller according to an embodiment of this application.
Figure 9B:
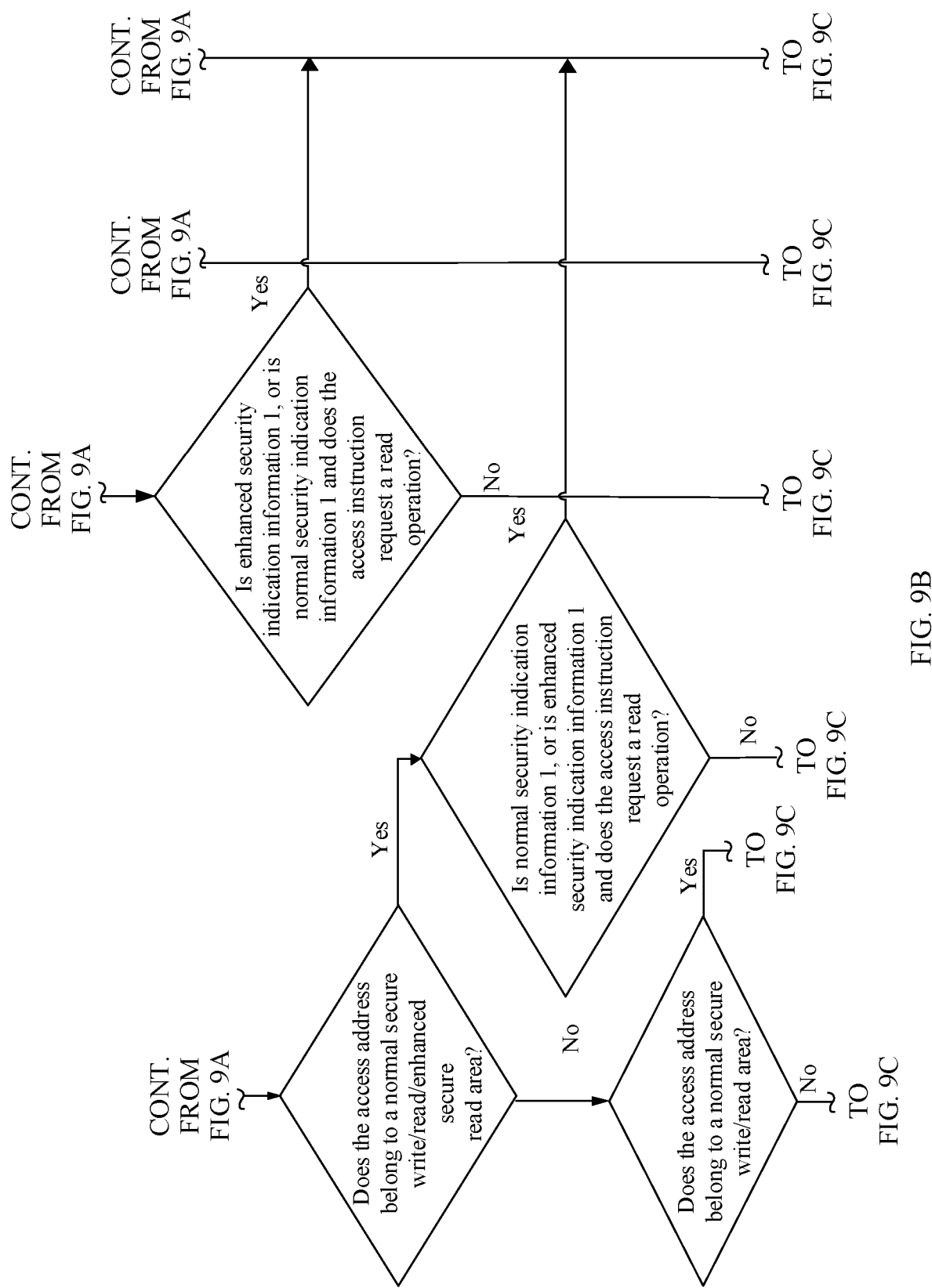
Figure 9C:
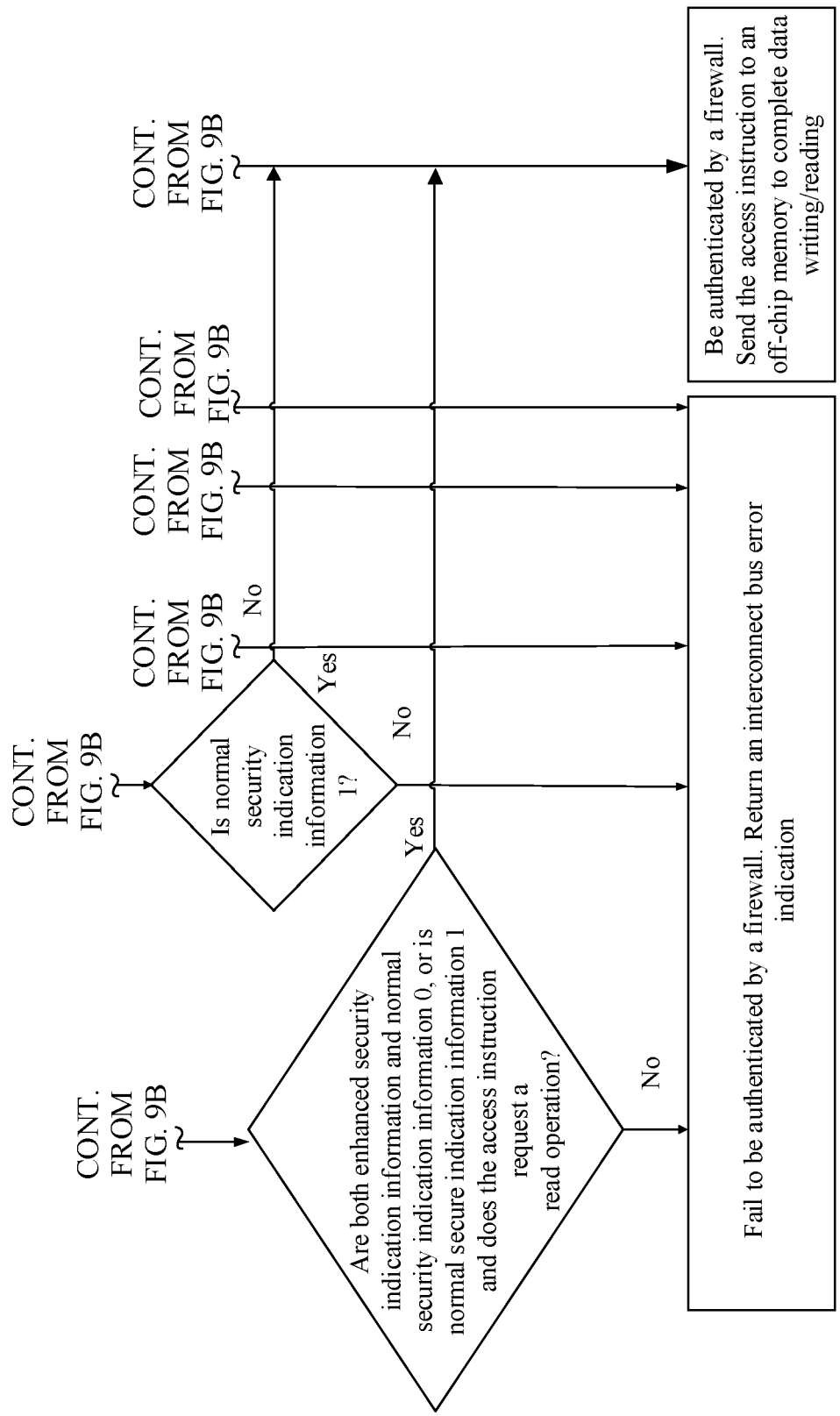

As mentioned above, a firewall in the storage controller 703 may be configured to perform the foregoing authentication operation on an access instruction. When performing authentication, the firewall needs to determine a storage area to which an address requested by the access instruction belongs. A plurality of storage areas are configured in the off-chip memory. Therefore, when receiving an access instruction sent by a processor, the firewall in the storage controller 703 needs to determine, for each of the storage areas, whether an address requested by the access instruction belongs to the storage area. Assuming that the off-chip memory uses the storage area configuration manner shown in FIG. 4, when the firewall in the storage controller 703 performs authentication on a received access instruction, a specific procedure may be shown in FIG. 9A, FIG. 9B, and FIG. 9C.

Specifically, after receiving an access instruction for accessing the off-chip memory, the storage controller 703 first determines whether an access address corresponding to the access instruction belongs to the enhanced secure write/read area. If the access address belongs to the enhanced secure write/read area, the storage controller 703 determines whether enhanced security indication information in the access instruction is "1". If the enhanced security indication information is "1", it indicates that a processor sending the access instruction is in the enhanced secure mode, the access instruction is authenticated by the firewall, and the storage controller 703 sends the access instruction to the off-chip memory to complete data writing/reading; or if the enhanced security indication information is "0", it indicates that a processor sending the access instruction is not in the enhanced secure mode, the access instruction fails to be authenticated by the firewall, and the storage controller 703 returns an interconnect bus error indication.

If the access address corresponding to the access instruction does not belong to the enhanced secure write/read area, the storage controller 703 determines whether the access address belongs to the enhanced secure write/read/normal secure read area. If the access address belongs to the enhanced secure write/read/normal secure read area, the storage controller 703 determines whether enhanced security indication information in the access instruction is "1", or determines whether normal security indication information is "1" and the access instruction requests a read operation. If the normal security indication information is "1", it indicates that the processor is in the normal secure mode. If either of the foregoing two conditions is met, the access instruction is authenticated by the firewall, and the storage controller 703 sends the access instruction to the off-chip memory to complete data writing/reading. If neither of the foregoing two conditions is met, the access instruction fails to be authenticated by the firewall, and the storage controller 703 returns an interconnect bus error indication.

If the access address corresponding to the access instruction does not belong to the enhanced secure write/read/normal secure read area, the storage controller 703 determines whether the access address belongs to the normal secure write/read/enhanced secure read area. If the access address belongs to the normal secure write/read/enhanced secure read area, the storage controller 703 determines whether normal security indication information in the access instruction is "1", or determines whether enhanced security indication information is "1" and the access instruction requests a read operation. If either of the foregoing two conditions is met, the access instruction is authenticated by the firewall; or if neither of the foregoing two conditions is met, the access instruction fails to be authenticated by the firewall.

If the access address corresponding to the access instruction does not belong to the normal secure write/read/enhanced secure read area, the storage controller 703 determines whether the access address belongs to a normal secure write/read area. If the access address belongs to the normal secure write/read area, the storage controller 703 determines whether normal security indication information in the access instruction is "1". If the normal security indication information is "1", it indicates that a processor sending the access instruction is in the normal secure mode, and the access instruction is authenticated by the firewall. If the normal security indication information is "0", it indicates that a processor sending the access instruction is not in the normal secure mode, and the access instruction fails to be authenticated by the firewall.

If the access address corresponding to the access instruction does not belong to the normal secure write/read area, it indicates that the access address belongs to a non-secure write/read/normal secure read area. In this case, the storage controller 703 may determine whether both enhanced security indication information and normal security indication information are "0", or determine whether normal security indication information is "1" and the access instruction requests a read operation. If either of the foregoing two conditions is met, the access instruction is authenticated by the firewall; or if neither of the foregoing two conditions is met, the access instruction fails to be authenticated by the firewall.

It can be learned from the foregoing descriptions of the authentication procedure of the firewall that, during authentication, the firewall needs to determine, for each of the storage areas, whether an address requested by an access instruction belongs to the storage area. After determining that the access address belongs to the storage area, the firewall determines whether a security attribute of the processor sending the access instruction and a write/read attribute of the access instruction meet requirements of the storage area. If the security attribute of the processor sending the access instruction and the write/read attribute of the access instruction meet the requirements of the storage area, the access instruction is authenticated; or if either of the security attribute of the processor sending the access instruction and the write/read attribute of the access instruction does not meet the requirements of the storage area, the access instruction fails to be authenticated.

Certainly, the foregoing authentication procedure is only an example. In this procedure, the storage area configuration of the off-chip memory uses the manner shown in FIG. 4 as an example. If the storage area configuration of the off-chip memory uses another manner, the authentication procedure may be adjusted accordingly based on the storage area configuration of the memory. In addition, in the authentication procedure shown in FIG. 9A, FIG. 9B, and FIG. 9C, it needs to be determined, for each of storage areas, whether an access address belongs to the storage area. In an actual application, a sequence of determining storage areas is not limited to the manner shown in FIG. 9A, FIG. 9B, and FIG. 9C.

In this embodiment of this application, when performing authentication on an access instruction, the storage controller 703 needs to determine, based on the storage area configuration information of the off-chip memory, a storage area corresponding to an access address. As described above, the storage area configuration information of the off-chip memory may be stored in the local register of the storage controller 703. During specific implementation, the security processor 702 and the application processor 701 may configure the storage area.

For example, the security processor 702 is further configured to configure the first storage area as a storage area that allows the processor in the normal secure mode to perform a write/read operation and allows the processor in the enhanced secure mode to perform a read operation.

Specifically, the security processor 702 may send first configuration information to the storage controller 703. The first configuration information is used to indicate that the first storage area allows the processor in the normal secure mode to perform a write/read operation and allows the processor in the enhanced secure mode to perform a read operation. Then the storage controller 703 stores the first configuration information.

For example, the security processor 702 is further configured to configure the second storage area as a storage area that allows the processor in the enhanced secure mode to perform a write/read operation and allows the processor in the normal secure mode to perform a read operation.

Specifically, the security processor 702 may send second configuration information to the storage controller 703. The second configuration information is used to indicate that the second storage area allows the processor in the enhanced secure mode to perform a write/read operation and allows the processor in the normal secure mode to perform a read operation. Then the storage controller 703 stores the second configuration information.

The security processor 702 may send the first configuration information and the second configuration information to the storage controller 703 by using one configuration message, or may separately send the first configuration information and the second configuration information.

The foregoing describes only configuration of the first storage area and the second storage area of the off-chip memory. In an actual application, the security processor 702 and the application processor 701 may configure another storage area in the off-chip memory, for example, configure the enhanced secure write/read area, the normal secure write/read area, or the non-secure write/read/normal secure read area. A configuration process of the another storage area is similar to the foregoing configuration processes of the first storage area and the second storage area, and details are not described herein again.

It should be noted that in this embodiment of this application, to improve system security, all storage areas related to the enhanced secure attribute are configured by the security processor 702. For example, for the storage area configuration of the off-chip memory shown in FIG. 4, the enhanced secure write/read area, the enhanced secure write/read/normal secure read area, and the normal secure write/read/enhanced secure read area are all configured by the security processor 702.

In addition, it can be learned from the foregoing descriptions of the authentication procedure of the firewall that, in addition to determining a storage area to which an access address belongs, the firewall needs to determine a security attribute of a processor sending the access instruction. As mentioned in the foregoing descriptions, security attribute information (namely, normal security indication information) of the application processor 701 may be transmitted by using a secure signal cable in a configuration interconnect bus, and security attribute information (namely, enhanced security indication information) of the security processor 702 may be transmitted by using an enhanced secure signal cable in the configuration interconnect bus. After receiving an access instruction, the storage controller 703 may determine, by using enhanced security indication information and normal security indication information that are transmitted on the two user-defined signal cables, a security attribute of a processor sending the access instruction.

The storage controller 703 may be further configured to: when enhanced security indication information in the first read instruction is a first specified value, determine that the security processor 702 is in the enhanced secure mode. The enhanced security indication information is transmitted by using a signal cable in an internal interconnect bus of the integrated chip.

In a specific application, the first specified value may be "1".

In this embodiment of this application, only the security processor 702 can set the enhanced security indication information to the first specified value. Therefore, when the enhanced security indication information in the first read instruction is the first specified value, the storage controller 703 may determine that the processor sending the first read instruction is in the enhanced secure mode.

In addition to the foregoing manner of determining the enhanced secure mode, the storage controller 703 may determine, based on enhanced security indication information and normal security indication information, whether a processor is in the normal secure mode or the non-secure mode.

For example, if the enhanced security indication information is "1", i t indicates that the processor sending the access instruction is in the enhanced secure mode; or if the enhanced security indication information is "0" and the normal security indication information is "1", it indicates that the processor sending the access instruction is in the normal secure mode; or if the enhanced security indication information is "0" and the normal security indication information is "0", it indicates that the processor sending the access instruction is in the non-secure mode.

Figure 3:
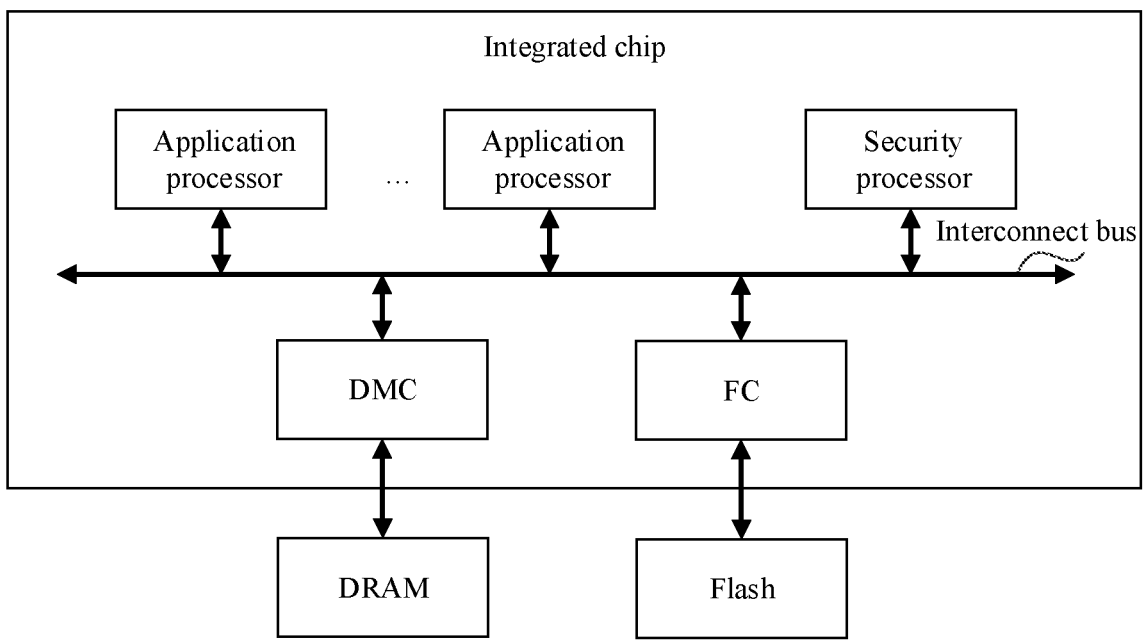
FIG. 3 is a schematic diagram of a structure of the second integrated chip according to an embodiment of this application.

The following describes a processing process of an enhanced security application in the embodiments of this application by using an example in which an integrated chip is an SoC and the SoC uses the structure shown in FIG. 3. Specifically, an operation procedure of the SoC may be shown in FIG. 10.

1. Start the enhanced security application.
2. After the SoC starts, a CPU in an EPS configures an enhanced security related area of a DMC.

The enhanced security related area includes an enhanced secure write/read area, an enhanced secure write/read/normal secure read area, and a normal secure write/read/enhanced secure read area. In other words, all storage areas related to write/read permission of a processor with an enhanced secure attribute may be considered as enhanced security related areas. The enhanced security related area is configured by the CPU in the EPS.

3. An encryption/decryption engine module in the EPS decrypts and verifies an enhanced secure application program and enhanced secure data that are stored in a flash memory, and stores, in an enhanced secure write/read area in a DRAM, data obtained after the decryption and verification.

The data obtained after the decryption and verification are stored in the enhanced secure write/read area. The data can be accessed only by the processor with the enhanced secure attribute, for example, can be accessed only by the CPU or the encryption/decryption engine module in the EPS.

4. An AP encounters an application that needs to be processed by the EPS, writes, into a normal secure write/read/enhanced secure read area in the DRAM, raw data that needs to be processed by the EPS, and sends an interrupt to the CPU in the EPS.

After the AP sends the interrupt, the EPS may read the data written by the AP into the normal secure write/read/enhanced secure read area.

5. After the CPU in the EPS receives the interrupt, the EPS reads and operates the data output by the AP to the DRAM. All intermediate data is written into the enhanced secure write/read area in the DRAM.

The intermediate data is intermediate data generated when the EPS performs an operation. The intermediate data is stored in the enhanced secure write/read area and can be accessed only by the processor with the enhanced secure attribute (for example, the CPU or the encryption/decryption engine module in the EPS).

6. After completing the operation, the EPS writes a final result into an enhanced secure write/read/normal secure read area in the DRAM, and sends an interrupt to the AP.

After the EPS sends the interrupt, the AP may read the final result written by the EPS into the enhanced secure write/read/normal secure read area.

7. After receiving the interrupt, the AP reads the final result of the operation of the EPS from the enhanced secure write/read/normal secure read area in the DRAM.

8. End the enhanced security application.

Figure 10:
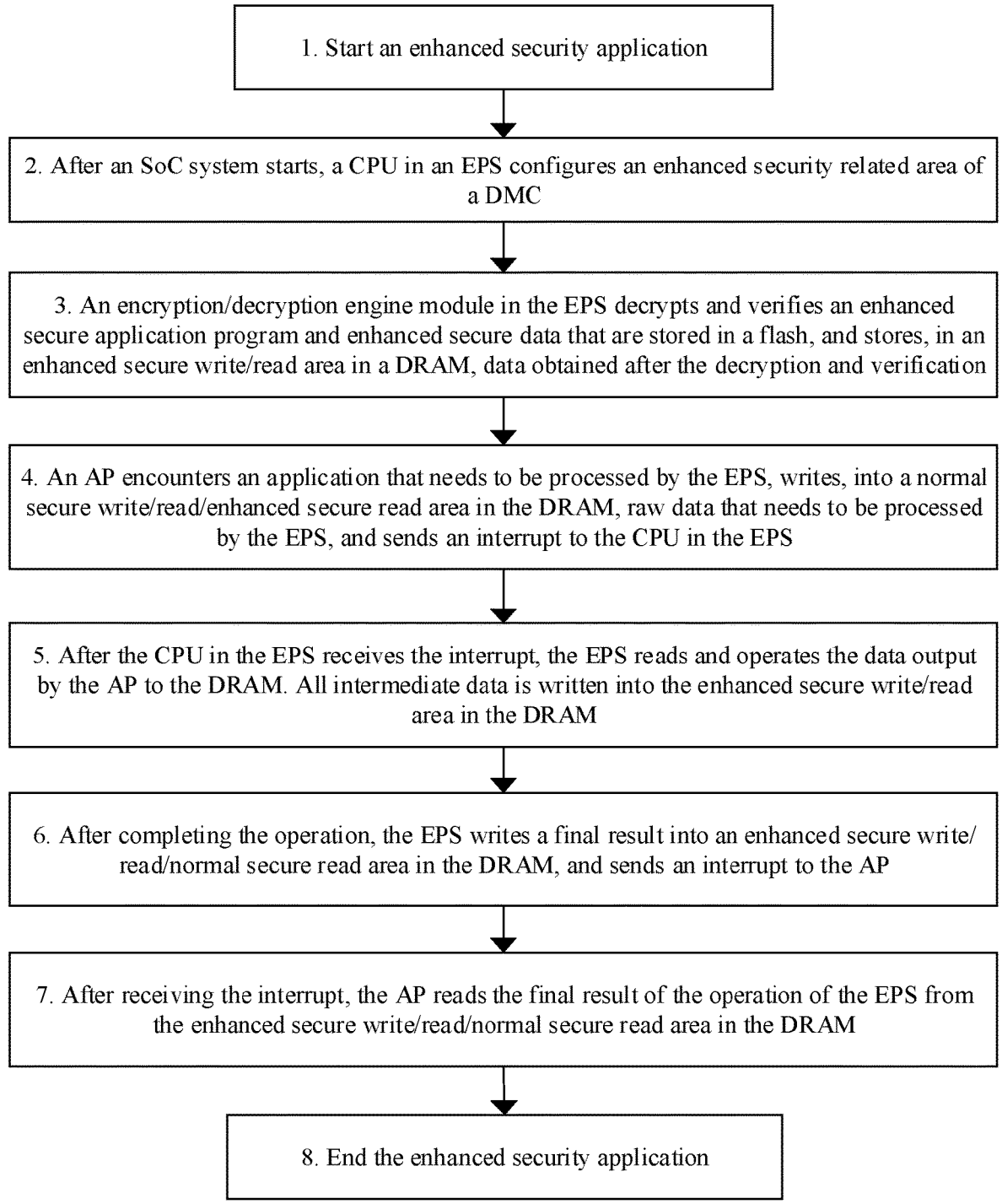
FIG. 10 is a schematic flowchart of operations performed by an SoC according to an embodiment of this application.

It should be noted that the processing process shown in FIG. 10 is only a specific example of an interaction procedure between the application processor and the security processor in this embodiment of this application. For an implementation not described in detail in the processing procedure shown in FIG. 10, refer to related descriptions of the integrated chip 700 shown in FIG. 7.

In conclusion, according to the integrated chip 700 provided in this embodiment of this application, after the application processor 701 is configured to write the first data into the off-chip memory in the normal secure mode by using the storage controller 703, the security processor 702 may read the first data in the enhanced secure mode by using the storage controller 703. In the foregoing solution, the application processor 701 can transmit the first data to the security processor 702. In the integrated chip 700, the application processor 701 and the security processor 702 may exchange data by using the off-chip memory under control of the storage controller 703. Compared with a solution in the conventional technology in which an application processor interacts with a security processor by using an email box (Inbox and Outbox), the interaction solution provided in this embodiment of this application can improve information exchange efficiency because both storage space and transmission bandwidth of the off-chip memory are large. Especially, when a large data stream service is processed, using the off-chip memory to perform data exchange can greatly reduce service processing time, and service processing efficiency is improved.

In addition, the processor in this embodiment of this application has three levels of security architectures, in other words, a security architecture (namely, an enhanced secure security architecture) with a higher security level is added on the basis of two levels of security architectures, namely, a non-secure security architecture and a secure security architecture, of an original integrated chip. The processor in the integrated chip may have three security attributes. A security level of an enhanced secure attribute is the highest, a security level of a normal secure attribute is the second, and a security level of a non-secure attribute is the lowest. During specific implementation, the security processor 702 with the enhanced secure attribute has an independent hardware architecture and a storage area (the enhanced secure write/read area) not shared with a processor with another security attribute. Therefore, secure space that can hardly be accessed by malicious code can be formed in the security processor 702, so that key data of a user is protected at a hardware level, and the key data of the user is stored in the enhanced secure write/read area, thereby ensuring security of the key data of the user.

Figure 11:
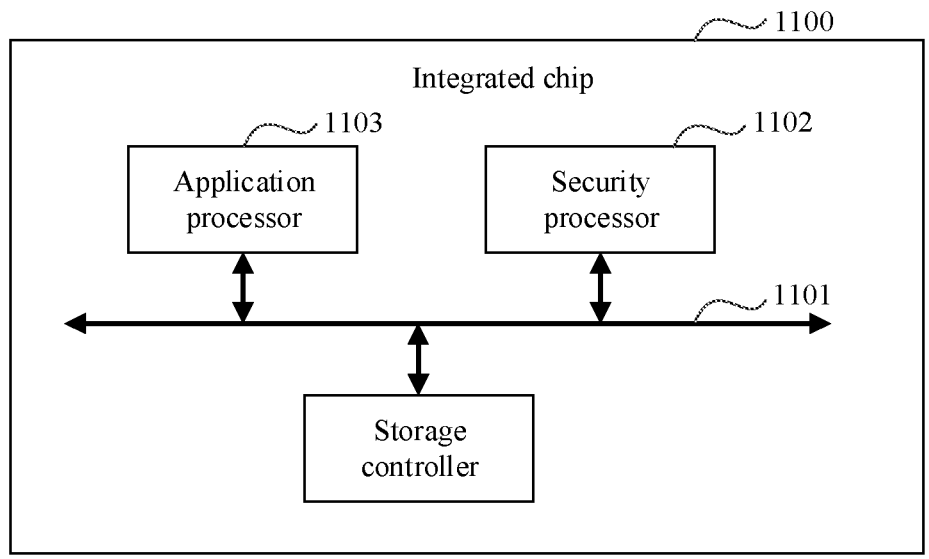
FIG. 11 is a schematic diagram of a structure of the fourth integrated chip according to an embodiment of this application.

Based on a same inventive concept, an embodiment of this application further provides an integrated chip. Refer to FIG. 11. The integrated chip 1100 includes: an interconnect bus 1101 including a first signal cable and a second signal cable, where the first signal cable is configured to transmit enhanced security indication information, and the second signal cable is configured to transmit normal security indication information; a security processor 1102, configured to send a first read instruction to a storage controller in an enhanced secure mode by using the interconnect bus 1101, where enhanced security indication information included in the first read instruction is transmitted by using the first signal cable; and an application processor 1103, configured to send a second read instruction to the storage controller in a normal secure mode by using the interconnect bus, where normal security indication information included in the second read instruction is transmitted by using the second signal cable.

The first signal cable may be the enhanced secure signal cable in the signal cable configuration of the interconnect bus shown in FIG. 5, and the second signal cable may be the secure signal cable in the signal cable configuration of the interconnect bus shown in FIG. 5.

In the integrated chip 1100, the security processor 1102, the application processor 1103, and the storage controller are connected by using the interconnect bus 1101. Access instructions (including the first read instruction and the second read instruction) sent by the security processor 1102 and the application processor 1103 by using the interconnect bus 1101 include enhanced security indication information and normal security indication information. The enhanced security indication information is transmitted by using the first signal cable in the interconnect bus 1101, and the normal security indication information is transmitted by using the second signal cable in the interconnect bus 1101. The storage controller may determine, based on the received enhanced security indication information and normal security indication information, a security attribute of the processor sending the access instruction.

Specifically, the integrated chip 1100 may further include the storage controller. The storage controller is configured to: when the enhanced security indication information included in the first read instruction is a first specified value, determine that the security processor 1102 is in the enhanced secure mode.

For example, the first specified value may be "1". In this embodiment of this application, only the security processor 1102 can set the enhanced security indication information to the first specified value. Therefore, when the enhanced security indication information in the first read instruction is the first specified value, the storage controller may determine that the processor sending the first read instruction is in the enhanced secure mode.

In addition, the storage controller is further configured to: when the normal security indication information in the second read instruction is a second specified value, determine that the application processor 1103 is in the normal secure mode; or when the normal security indication information in the second read instruction is a third specified value, determine that the application processor 1103 is in a non-secure mode.

For example, the second specified value may be "1", and the third specified value may be "0".

In the integrated chip 1100, after receiving the second read instruction, the storage controller determines that the enhanced security indication information in the second read instruction is not the first specified value, and the storage controller may determine that the application processor 1103 sending the second read instruction does not have an enhanced secure attribute. In this case, the storage controller further determines the normal security indication information in the second read instruction, and if the normal security indication information is the second specified value, determines that the application processor 1103 is in the normal secure mode; or if the normal security indication information is the third specified value, determines that the application processor 1103 is in the non-secure mode.

It should be understood that in the integrated chip 1100, after receiving a read instruction, the storage controller determines, based on enhanced security indication information and normal security indication information in the read instruction, a security attribute of a processor sending the read instruction. Similarly, after receiving a write instruction, the storage controller also determines, based on enhanced security indication information and normal security indication information in the write instruction, a security attribute of a processor sending the write instruction. A determining manner is the same as the foregoing manner of determining the read instruction, and details are not described herein again.

It should be noted that both the integrated chip 1100 and the integrated chip 700 are integrated chips provided in the embodiments of this application. For implementations of the integrated chip 1100 and the integrated chip 700, refer to each other. Details are not described herein again.

Figure 12:
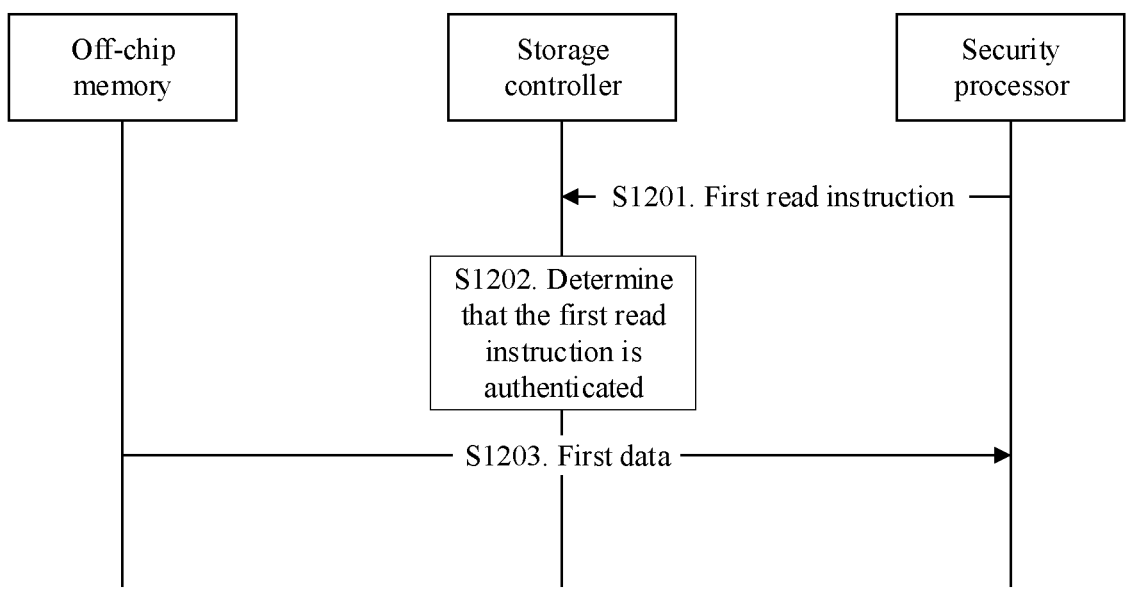
FIG. 12 is a schematic flowchart of a data processing method according to an embodiment of this application.

Based on a same inventive concept, an embodiment of this application further provides a data processing method. Refer to FIG. 12. The data processing method includes the following steps.

S1201. A storage controller receives a first read instruction sent by a security processor.

The first read instruction is used to request to read first data at a first address in an off-chip memory.

S1202. The storage controller determines that the first read instruction is authenticated.

S1203. The storage controller reads the first data from the off-chip memory, and sends the first data to the security processor.

Optionally, the storage controller may specifically determine, in the following manner, that the first read instruction is authenticated: The storage controller determines, by querying a local register, that the first address belongs to a first storage area of the off-chip memory. The first storage area is configured to allow a processor in a normal secure mode to perform a write/read operation and allow a processor in an enhanced secure mode to perform a read operation. The storage controller determines that the security processor is in the enhanced secure mode and the first read instruction is a read instruction.

Further, the storage controller may specifically determine, in the following manner, that the security processor is in the enhanced secure mode: When enhanced security indication information in the first read instruction is a first specified value, the storage controller determines that the security processor is in the enhanced secure mode.

In addition, the data processing method shown in FIG. 12 further includes: The storage controller receives first configuration information sent by the security processor. The first configuration information is used to indicate that the first storage area allows the processor in the normal secure mode to perform a write/read operation and allows the processor in the enhanced secure mode to perform a read operation. The storage controller stores the first configuration information in the local register.

Optionally, the data processing method shown in FIG. 12 further includes: After sending the first data to the security processor, the storage controller receives a first write instruction sent by the security processor. The first write instruction is used to request to write processed data into a second address, and the processed data is obtained after the security processor processes the first data. The storage controller determines that the first write instruction is authenticated. The storage controller writes the processed data into the second address.

Optionally, the storage controller may determine, in the following manner, that the first write instruction is authenticated: The storage controller determines, by querying the local register, that the second address belongs to a second storage area of the off-chip memory. The second storage area is configured to allow the processor in the enhanced secure mode to perform a write/read operation and allow the processor in the normal secure mode to perform a read operation. The storage controller determines that the security processor is in the enhanced secure mode.

Further, the storage controller may receive second configuration information sent by the security processor. The second configuration information is used to indicate that the second storage area allows the processor in the enhanced secure mode to perform a write/read operation and allows the processor in the normal secure mode to perform a read operation. The storage controller stores the second configuration information in the local register.

The security processor may send the first configuration information and the second configuration information by using one message, or may separately send the first configuration information and the second configuration information.

Optionally, the data processing method shown in FIG. 12 further includes: After writing the processed data into the second address, the storage controller receives a second read instruction sent by an application processor. The second read instruction is used to request to read the processed data. The storage controller determines that the second read instruction is authenticated. Then the storage controller reads the processed data, and sends the processed data to the application processor.

Specifically, the storage controller may determine, in the following manner, that the second read instruction is authenticated: The storage controller determines that the second address belongs to the second storage area. The storage controller determines that the application processor is in the normal secure mode and the second read instruction is a read instruction.

Specifically, the storage controller may determine, in the following manner, that the application processor is in the normal secure mode: When the normal security indication information in the second read instruction is a second specified value, the storage controller determines that the application processor is in the normal secure mode.

It should be noted that the data processing method shown in FIG. 12 is a specific example of an authentication procedure of the storage controller 703 in the integrated chip 700 shown in FIG. 7. For implementations and technical effects that are not described in detail in the data processing method shown in FIG. 12, refer to related descriptions of the integrated chip 700 shown in FIG. 7.

Definitely, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. An integrated chip, comprising:
an application processor, configured to send, in a normal secure mode, first data to a storage controller to prompt the storage controller to write the first data into a first address of an off-chip memory;
a security processor, configured to send, in an enhanced secure data exchange mode, a first read instruction to the storage controller to prompt the storage controller to read the first data at the first address and to send the first data to the security processor; and
wherein:
in a normal secure data exchange mode, the application processor prompts, retrieves and reads processed data from the off-chip memory via the storage controller and in an enhanced secure mode, the security processor receives data retrieved by the storage controller; and
after writing the processed data into the off-chip memory via the storage controller, the security processor is configured notify, in an interrupt manner, the application processor to read the processed data.

2. The integrated chip according to claim 1 wherein the security processor is further configured to: process the read first data in the enhanced secure data exchange mode, and send the processed data to the storage controller to write into the off-chip memory.

3. The integrated chip according to claim 1, wherein the application processor is further configured to:
send a second read instruction to the storage controller in the normal secure data exchange mode, prompt the storage controller to read the processed data and to send the processed data to the application processor.

4. The integrated chip according to claim 1, wherein before the storage controller reads the first data, the storage controller is further configured to:
determine that the first read instruction is authenticated.

5. The integrated chip according to claim 4, wherein the storage controller is further configured to:
determine that the first address belongs to a first storage area of the off-chip memory, wherein the first storage area is configured to allow a processor in the normal secure data exchange mode to perform a write or read operation and allow a processor in the enhanced secure mode to perform a read operation; and
determine that the security processor is in the enhanced secure data exchange mode and the first read instruction is a read instruction.

6. The integrated chip according to claim 1, wherein the security processor is further configured to:
send, in the enhanced secure mode, a first write instruction to the storage controller to indicate the storage controller to write the processed data into a second address; and
the storage controller is further configured to:
determine that the first write instruction is authenticated; and
write the processed data into the second address.

7. The integrated chip according to claim 6, wherein the storage controller is further configured to:
determine that the second address belongs to a second storage area of the off-chip memory, wherein the second storage area is configured to allow the processor in the enhanced secure data exchange mode to perform a write or read operation and allow the processor in the normal secure mode to perform a read operation; and
determine that the security processor is in the enhanced secure data exchange mode.

8. The integrated chip according to claim 1, wherein the security processor is further configured to:
before processing the read first data, write second data into the off-chip memory in the enhanced secure mode by using the storage controller, wherein an address of the second data in the off-chip memory is a third address; and
wherein the security processor is further configured to:
send, in the enhanced secure mode, a third read instruction to the storage controller to request to read the second data at the third address;
read the second data from the off-chip memory by using the storage controller; and
compare the first data with the second data, and use a comparison result as the processed data.

9. A data processing method, comprising:
in a normal secure data exchange mode:
sending first data to a storage controller by an application processor to prompt the storage controller to write the first data into a first address of an off-chip memory;
retrieving and reading the processed data from the off-chip memory via the storage controller; and
in an enhanced secure data exchange mode:
receiving, by the storage controller, a first read instruction sent by a security processor wherein the first read instruction is used to request to read first data at a first address in an off-chip memory;
determining, by the storage controller, that the first read instruction is authenticated by:
determining, by the storage controller by querying a local register, that the first address belongs to a first storage area of the off-chip memory, wherein the first storage area is configured to allow a processor in the normal secure data exchange mode to perform a write or read operation and allow a processor in the enhanced secure data exchange mode to perform a read operation; and
determining, by the storage controller, that the security processor is in the enhanced secure data exchange mode and the first read instruction is a read instruction; and
reading, by the storage controller, the first data from the off-chip memory, and sending the first data to the security processor;
receiving, by the storage controller, first configuration information sent by the security processor, wherein the first configuration information is used to indicate that the first storage area allows the processor in the normal secure mode to perform a write or read operation and allows the processor in the enhanced secure data exchange mode to perform a read operation; and
storing, by the storage controller, the first configuration information in the local register.

10. The method according to claim 9, wherein the determining, by the storage controller, that the security processor is in the enhanced secure data exchange mode comprises:
when enhanced security indication information in the first read instruction is a first specified value, determining, by the storage controller, that the security processor is in the enhanced secure data exchange mode.

11. The method according to claim 9, further comprising:
- after sending the first data to the security processor, receiving, by the storage controller, a first write instruction sent by the security processor, wherein the first write instruction is used to request to write processed data into a second address, and the processed data is obtained after the security processor processes the first data;
- determining, by the storage controller, that the first write instruction is authenticated; and
- writing, by the storage controller, the processed data into the second address.

12. The method according to claim 11, further comprising:
- receiving, by the storage controller, second configuration information sent by the security processor, wherein the second configuration information is used to indicate that the second storage area allows the processor in the enhanced secure data exchange mode to perform a write or read operation and allows the processor in the normal secure mode to perform a read operation; and
- storing, by the storage controller, the second configuration information in the local register.

* * * * *